United States Patent
Munger et al.

(10) Patent No.: US 11,195,140 B1
(45) Date of Patent: Dec. 7, 2021

(54) DETERMINATION OF UNTIDY ITEM RETURN TO AN INVENTORY LOCATION USING WEIGHT

(71) Applicant: AMAZON TECHNOLOGIES, INC., Seattle, WA (US)

(72) Inventors: Paul Eugene Munger, Seattle, WA (US); Jayakrishnan Kumar Eledath, Kenmore, WA (US); Daniel Bibireata, Bellevue, WA (US); Gopi Prashanth Gopal, Redmond, WA (US); Liefeng Bo, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 441 days.

(21) Appl. No.: 15/703,302

(22) Filed: Sep. 13, 2017

(51) Int. Cl.
  *G06Q 10/08* (2012.01)
  *G06Q 20/20* (2012.01)

(52) U.S. Cl.
  CPC ......... *G06Q 10/087* (2013.01); *G06Q 20/208* (2013.01)

(58) Field of Classification Search
  CPC .. G06Q 10/087; G06Q 20/208; G07F 7/0618; G07F 7/0627; G07F 7/0645; G07F 7/0636; G01F 9/003
  See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 9,473,747 B2 | 10/2016 | Kobres et al. | |
| 2007/0144794 A1* | 6/2007 | O'Mahony | G01G 17/04 177/210 FP |
| 2011/0011936 A1 | 1/2011 | Morandi et al. | |

(Continued)

OTHER PUBLICATIONS

Asthana, et al., "An Indoor Wireless System For Personalized Shopping Assistance", CiteSeerX, In Proceedings of IEEE Workshop on Mobile Computing Systems and Applications, 1994. Retrieved from Internet: <URL:http://citeseerx.ist.psu.edu/viewdoc/summary?doi=10.1.1.127.3033>.

(Continued)

*Primary Examiner* — Florian M Zeender
*Assistant Examiner* — Vanessa Deligi
(74) *Attorney, Agent, or Firm* — Lindauer Law, PLLC

(57) ABSTRACT

A user may pick an item from a first inventory location, such as in a lane on a shelf, and may return it another location that is assigned to another type of item. Described are techniques to generate tidiness data that is indicative of whether an item has been returned to an inventory location assigned to that type of item. As items are taken, information about the type of item taken and its weight are stored. When an increase in weight at a lane indicates a return of an item to the lane, the weight of the return is compared to the stored weight of the items previously taken by a user. If the weights correspond to within a threshold value, the type of item associated with the stored weight is deemed to be returned and tidiness data indicative of a tidy return of the item to its appointed lane may be generated.

20 Claims, 8 Drawing Sheets

(56) References Cited

U.S. PATENT DOCUMENTS

| | | | |
|---|---|---|---|
| 2012/0284132 A1 | 11/2012 | Kim et al. | |
| 2013/0284806 A1 | 10/2013 | Margalit | |
| 2014/0083779 A1* | 3/2014 | Sharma | G01G 19/44 177/1 |
| 2015/0086107 A1 | 3/2015 | Dedeoglu et al. | |
| 2015/0127496 A1* | 5/2015 | Marathe | G06Q 10/087 705/28 |
| 2016/0132854 A1* | 5/2016 | Singh | G06Q 20/208 705/23 |
| 2018/0374046 A1* | 12/2018 | Powers | G06Q 10/08345 |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_super_markets>.

Pop, Cristian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

* cited by examiner

CART STATE DATA
224

| ITEM IDENTIFIER 402 | ITEM WEIGHT 404 | WEIGHT SOURCE 406 |
|---|---|---|
| 38538918 | 249 | ACTUAL |
| 38538918 | 247 | ACTUAL |
| 13200564 | 604 | ACTUAL |
| 67516515 | 875 | RETRIEVED |
| 13975487 | 1005 | ACTUAL |

⋮

SORTED CART STATE DATA
308

| ITEM IDENTIFIER 402 | ITEM WEIGHT 404 | WEIGHT SOURCE 406 | DIFFERENCE VALUE 304 | RANK 408 |
|---|---|---|---|---|
| 38538918 | 249 | ACTUAL | 12 | 1 |
| 38538918 | 247 | ACTUAL | 14 | 2 |
| 13200564 | 604 | ACTUAL | 343 | 3 |
| 67516515 | 875 | RETRIEVED | 614 | 4 |
| 13975487 | 1005 | ACTUAL | 744 | 5 |

DETERMINATION OF UNTIDY ITEM RETURN TO AN INVENTORY LOCATION USING WEIGHT

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates block diagrams of cart state data and sorted cart state data, according to some implementations.

Figure 1:
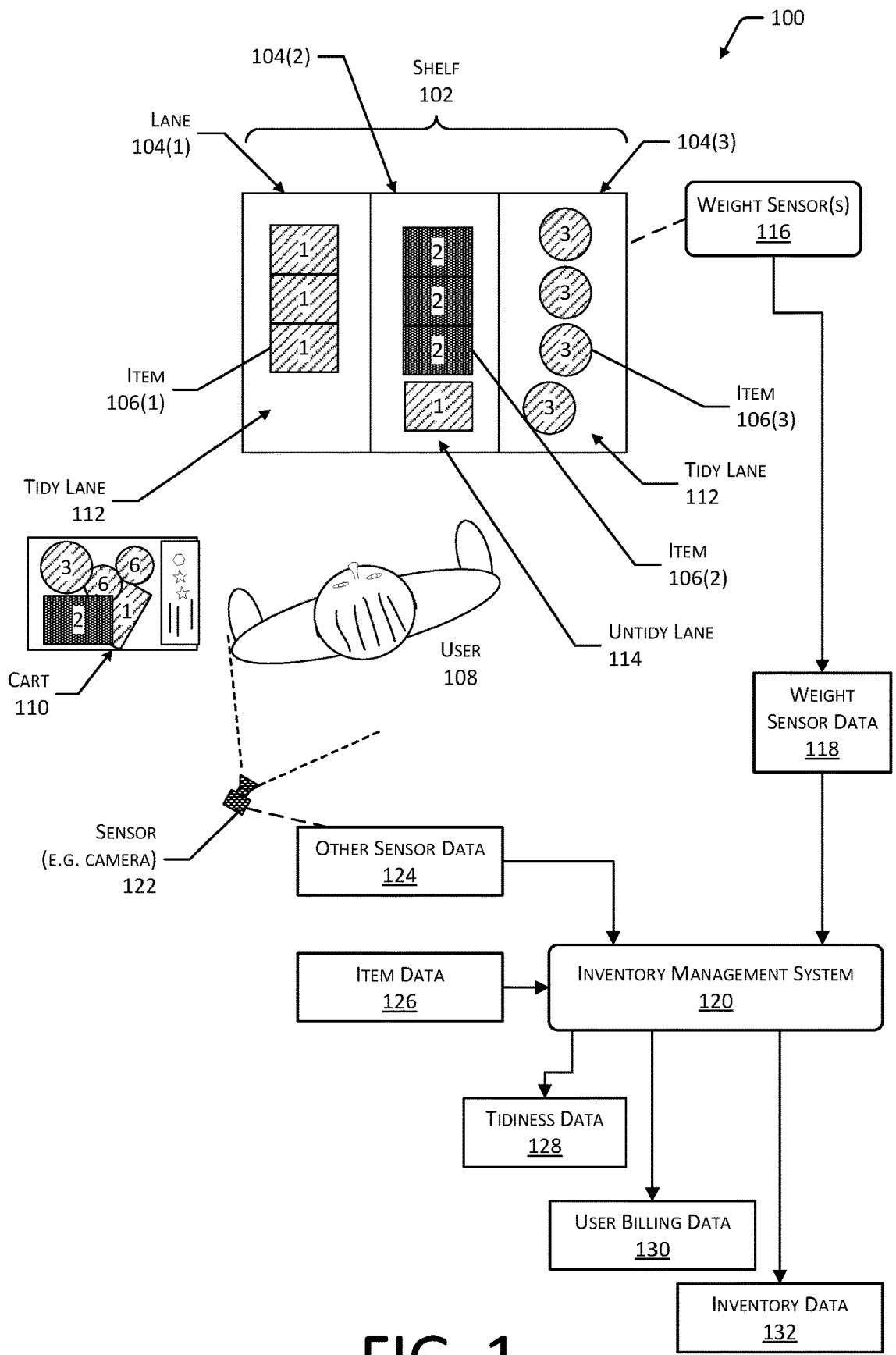
FIG. 1 illustrates a system that determines tidiness of a return of an item to an inventory location, such as a lane on a shelf, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A materials handling facility (facility) or other setting may utilize fixtures that provide inventory locations used to stow or otherwise hold items. The fixtures, such as shelves, hangers, and so forth, may be equipped with weight sensors. For example, the fixture may comprise a shelf with inventory locations comprising different lanes, within which are stowed different types of items.

The weight sensors may include one or more load cells and associated electronics. During operation, the weight sensors generate weight sensor data. The weight sensor data may then be sent to a computing device, such as a server. An inventory management system may use the weight sensor data to determine what item and what quantity of that item has been added to or removed from a particular location. During operation, the system may determine tidiness data that is indicative of whether an item has been returned to a particular location that is assigned to that type of item. For example, if the user picks a can of tomato soup from lane A which is assigned to hold tomato soup and returns it to lane A, the tidiness data would indicate a tidy return. However, if the user picks the can of tomato soup from lane A and returns it to lane F which is assigned to hold chicken soup, the tidiness data would indicate an untidy return.

The tidiness data may be indicative of one of a plurality of states. For example, tidiness data with a value of "tidy" may indicate that the type of item returned to a particular location is deemed to be the same as the type of item associated with that particular location. In comparison, tidiness data with a value of "untidy" may indicate that the type of item returned to a particular location is deemed to be different from the type of item associated with that particular location. In some implementations the tidiness data may have a value of "unknown" in which the type of item returned was not determined to be have been previously picked by a user.

The tidiness data may be used to maintain operation of the facility, further inform other operations of the inventory management system, and so forth. For example, tidiness data indicative of an untidy return may result in a dispatch of a human or robotic operator to correct the misplacement of the item and render the arrangement of the items tidy once again.

By maintaining a tidy store in which items are placed in their assigned locations, operation of the inventory management system may utilize fewer computing resources. For example, the possible actions associated with inventory movement in a tidy store are fewer and thus more computationally trackable than in an untidy store in which items may be located anywhere.

In another example, the tidiness data may be used to modify the operation of inventory management system. For example, responsive to tidiness data that indicates a particular lane is untidy, data from other sensors such as cameras may be processed to determine what item was removed from that particular lane.

Described in this disclosure are techniques for determining the tidiness data. When a return has been determined to occur, the system may determine the tidiness of the return. Cart state data is maintained that is indicative of the type of item and the weight of that type of item that is in the custody of the user, such as in their cart, tote, bag, bin, and so forth. As items are picked from the inventory location, item identifiers that are representative of those items are added to the cart state data. A return of an item may be determined based on a return event in which the weight change at an inventory location has increased. The tidiness data may then be generated by comparing the weight change value of a return event with the weight of the items in the cart state data.

In one implementation, difference values are determined for each of the item identifiers in the cart state data. The item identifiers represent particular items which may be in the custody of the user. The difference value may comprise the absolute value of the difference between the weight change value and the weight of each item in the cart state data.

The cart state data is sorted in ascending order of the difference value for each of the item identifiers. A first candidate item is the item identifier at the top of this list, and represents the item in the cart that is closest in weight to the item that was returned during the return event. Likewise, a second candidate item is the item identifier in the second position of this list, and represents the next closest item in the cart that is closest in weight to the item that was returned.

An assigned weight value for an item associated with the inventory location is determined. For example, the assigned weight value may be retrieved from a data store of weight associated with a sample item of the type stored in the inventory location. In another example, the assigned weight value may be obtained from the cart state data. Continuing this example, the user may have previously picked the item from the inventory location, producing an actual item weight value that is indicative of the weight of that item. The actual item weight value may be used as the assigned weight value.

If the weight of the first candidate item is unequal to (or beyond a threshold value or tolerance of) the weight of the assigned weight value for that inventory location, tidiness data may be generated that is indicative of an untidy return. However, if the weight of the first candidate item is within the threshold value of the assigned weight value, additional analysis as described next may be utilized to determine if the return was tidy or untidy.

The determination of the tidiness data may be subject to an assessment of error values "E" and a margin value "μ" for the available data. A first error value may comprise the absolute value of a difference between the weight change value and the weight of the first candidate item. A second error value may comprise the absolute value of a difference between the weight change value and the weight of the second candidate item.

The margin value comprises the difference between the first error value and the second error value. If the first error value is below a first threshold value and the margin value is above a second threshold value, the return event may be deemed to have a value of "tidy". For example, the return resulted in the placement of an item of the type associated with that particular inventory location to that particular inventory location. Otherwise, the return is deemed to be "untidy", that is, an item of a different type was placed in the inventory location.

In some implementations, the thresholds for comparison of the error value and margin value may be adapted to the particular conditions. For example, if events such as a pick and a place of an item occur relatively far apart in time (such as beyond a minimum time threshold), the thresholds may be reduced. In comparison, if there are a number of picks and places in rapid succession, the thresholds may be increased. In another example, thresholds may be associated with a particular user, inventory location, type of item, and so forth. For example, a commonly mistaken item may be subject to frequent takes and returns as a user removes the item from the shelf, looks at the package, and then return it. This commonly mistaken item may have thresholds for error value and margin value that are greater than for another item.

Determination of the tidiness data, as well as overall operation of the system, may be improved through the use of accurate weight data. Accuracy of the weight data may be improved using one or more of the following techniques. In one implementation, a piecewise constant filter may be used to determine changes in weight data that are indicative of a removal or placement event. Individual weight sensors or groups of weight sensors may be calibrated, and the calibration data may be used to produce weight data with improved accuracy. In another implementation, a nonlinear weight sensor response may be measured and used to compensate for weight-dependent bias at a particular weight sensor or group of weight sensors.

In yet another implementation, the number of samples of weight sensor data may be adjusted to improve accuracy. The number of samples of weight sensor data used to determine the weight data may be maximized, improving the accuracy of the weight data. For example, the weight on a shelf may be based on an average of samples of weight sensor data provided by the weight sensors that support the shelf. Continuing the example, weight sensor data may be gathered over an extended period of time before a pick of an item and after a return of an item. By increasing the time over which measurements are made, the ability to detect quick changes may be reduced but the overall accuracy of the weight data may be improved.

By using the techniques described in this disclosure, tidiness data that is indicative of whether an item has been returned to an assigned location may be determined. By using the tidiness data, performance of the system is improved by reducing the computational complexity required to determine with an automated system what items a user has picked or returned. As a result, the inventory management system is able to more quickly and efficiently operate. As items are picked and returned, the inventory management system is able to track what items are in the custody of the user. User billing data for items that are in the custody of the user may be generated, such as an invoice. The user billing data may be generated with little or no human intervention, reducing overall costs associated with the facility. Inventory data indicative of quantity on hand at particular inventory locations may be accurately maintained, reducing costs associated with inventory management.

Illustrative System

FIG. 1 illustrates a system 100 to determine tidiness of an inventory location, such as a lane on a shelf, according to some implementations. A shelf 102 may include one or more lanes 104. The lane 104 is an area upon the shelf 102 that is associated with a particular type of item 106. For example, the shelf 102 depicted here has three lanes 104(1), 104(2), and 104(3). Lane 104(1) may be associated with storing some quantity of item 106(1) such as Brand Z cat food, while lane 104(2) may be associated with storing some quantity of item 106(2) such as Brand X dog food, and lane 104(3) may be associated with storing some quantity of item 106(3) such as Brand Y fish food. In other implementations, instead of or in addition to lanes 104, hangers, bins, or other devices may be used to stow the items 106.

A user 108 may interact with the lanes 104 at the shelf 102. For example, the user 108 may remove item 106(1) from the lane 104(1) and take custody of the item 106(1). For example, the user 108 may place the item 106(1) into a cart 110, hold the item 106(1) while inspecting it, and so forth. The cart 110 may be associated with the user 108 or that user's 108 user account. The user 108 may decide, for any number of reasons, to return the item 106(1) to the shelf 102. The user 108 may place the item 106(1) into one of the lanes 104 on the shelf 102, or the lanes 104 of another shelf 102 (not shown). If the item 106 is returned to the lane 104 that is associated with that type of item 106, the lane 104 may be described as a tidy lane 112. Continuing the example, the user 108 may return item 106(1) to lane 104(1).

A tidy lane 112 may comprise a lane 104 for which only the one or more types of items 106 associated with that lane 104 are present. In comparison, an untidy lane 114 may comprise a lane 104 that is associated with one or more types of items 106, but at which an item 106 of another type of item has been placed.

The tidiness of a lane 104 may not necessarily be indicative of the arrangement or neatness on the shelf 102. For example, the lane 104(1) storing the cat food may have individual boxes of cat food that are more neatly arranged than the lane 104(3) storing fish food, but both may be deemed to be tidy lanes 112 because they contain only those types of items 106 that are associated with their respective lanes 104.

The shelf 102 is equipped with one or more weight sensors 116. For example, the shelf 102 may include four weight sensors 116(1)-(4), with each weight sensor 116 arranged proximate to a corner of the shelf 102. In another example, the weight in each lane 104 may be measured by an individual weight sensor 116. The weight sensors 116 provide weight sensor data 118 to an inventory management system 120.

Other sensors 122 may also be present at or near the shelf 102. For example, the sensor 122 may comprise a camera that is positioned to gather information about the shelf 102 or other type of inventory location. The sensor 122 may have a field of view (FOV) within which data may be acquired. The FOV includes at least a portion of the shelf 102 or other type of inventory location. For example, a camera 122(1) may acquire other sensor data 124 such as image data of the lane 104(2). In some implementations, each lane 104 or group of lanes 104 may have a respective sensor 122 having a FOV that looks at a particular lane 104 or group of lanes 104. The other sensor data 124 may comprise one or more still images, video, proximity sensor data, radio frequency identification tag data, audio data, and so forth.

An inventory management system 120 may use the weight sensor data 118, other sensor data 124, and other information such as item data 126 during operation. The inventory management system 120 may be configured, as described below, to perform various functions such as determining tidiness of the lane 104, tracking changes to a quantity on hand of the items 106 at the lane 104, and so forth based at least in part on the weight sensor data 118.

The item data 126 provides information about the characteristics of a particular type of item 106. These characteristics may include weight of the item 106 individually or in aggregate. For example, the item data 126 may comprise information indicative of a weight of a single item 106, or a package, kit, or other grouping considered to be a single item 106. Other information such as weight distribution may also be stored.

The item data 126 may include data about other characteristics, such as information about appearance for use in machine vision or manual recognition. For example, the item data 126 may include sample images of the type of item 106, three-dimensional point cloud data for the item 106, and so forth. The sample image data may comprise one or more images of one or more of that type of item 106. For example, sample image data may be obtained during processing or intake of the item 106 to be used by the facility.

The item data 126 may include other information about the appearance. For example, a plurality of local descriptor values may be generated by feature extraction algorithms, parameters for classifiers, neural network configuration data, and so forth, that characterizes the appearance of a representative of one or more of the item 106.

The item data 126 may include one or more of geometry data. The geometry data may include information indicative of size and shape of the item 106 in one, two, or three dimensions. For example, the geometry data may include the overall shape of an item 106, such as a cuboid, sphere, cylinder, and so forth. The geometry data may also include information such as length, width, depth, and so forth, of the item 106. Dimensional information in the geometry data may be measured in pixels, centimeters, inches, arbitrary units, and so forth. The geometry data may be for a single item 106, or a package, kit, or other grouping considered to be a single item 106.

The item data 126 may include an item identifier. The item identifier may be used to distinguish one type of item 106 from another. For example, the item identifier may include a stock keeping unit (SKU) string, Universal Product Code (UPC) number, and so forth. The items 106 that are of the same type may be referred to by the same item identifier. For example, cans of beef flavor Brand X dog food may be represented by the item identifier value of "9811901181". In other implementations, items 106 may each be provided with a unique item identifier, allowing each to be distinguished from one another.

The item data 126 may indicate the types and quantities of items 106 that are expected to be stored at that particular inventory location such as in a particular lane 104 on a shelf 102. The item data 126 may include one or more inventory location identifiers (IDs). The inventory location ID is indicative of a particular area or volume of an inventory location such as a shelf 102 that is designated for stowage of the type of item 106. For example, a single shelf 102 may have several lanes 104, each with a different inventory location ID. Each of the different inventory location IDs may be associated with a lane 104 having a particular area on the shelf 102 designated for storage of a particular type of item 106. A single type of item 106 may be associated with a particular inventory location ID, a plurality of inventory location IDs may be associated with the single type of item 106, more than one type of item 106 may be associated with the particular inventory location ID, and so forth.

The item data 126 may also include quantity data. The quantity data may comprise a count or value indicative of a number of items 106. The count may be a measured or an estimated value. The quantity data may be associated with a particular inventory location ID, for an entire facility, and so forth. For example, the same type of item 106 may be stored at different shelves 104 within the facility. The quantity data may indicate the quantity on hand for each of the different inventory locations.

During operation, the inventory management system 120 may generate tidiness data 128. The tidiness data 128 provides information indicative of whether a particular inventory location is tidy, that is, the inventory location is deemed to contain only those types of items 106 that are assigned to that inventory location. The tidiness data 128 may include values such as "tidy", "untidy", or "unknown". In some implementations the tidiness data 128 may be expressed as a value within a range or continuum. Generation of the tidiness data 128 is discussed in more detail below.

Operation of the inventory management system 120 may change based at least in part on the tidiness data 128. For example, if an inventory location such as lane 104(1) has tidiness data 128 indicative of a "tidy" state, then a high confidence value may be associated with the determination of what type of item 106 was picked from that inventory location. In comparison, if an inventory location is untidy, such as lane 104(2), a low confidence value may be associated with the determination of what type of item 106 was picked.

The inventory management system 120 may generate other data. In one implementation, user billing data 130 may be generated that comprises a bill or invoice for the items 106 that have been taken into the custody of the user 108. For example, as the user 108 leaves the facility with their cart 110, a list and cost associated with purchase for those items 106 may be determined, taxes or other fees assessed, and that information included in the user billing data 130.

The inventory management system 120 may also maintain inventory data 132. For example, the inventory data 132 may comprise information such as quantity on hand at a particular inventory location, determine when to order additional items 106 for restock, and so forth.

Figure 2:
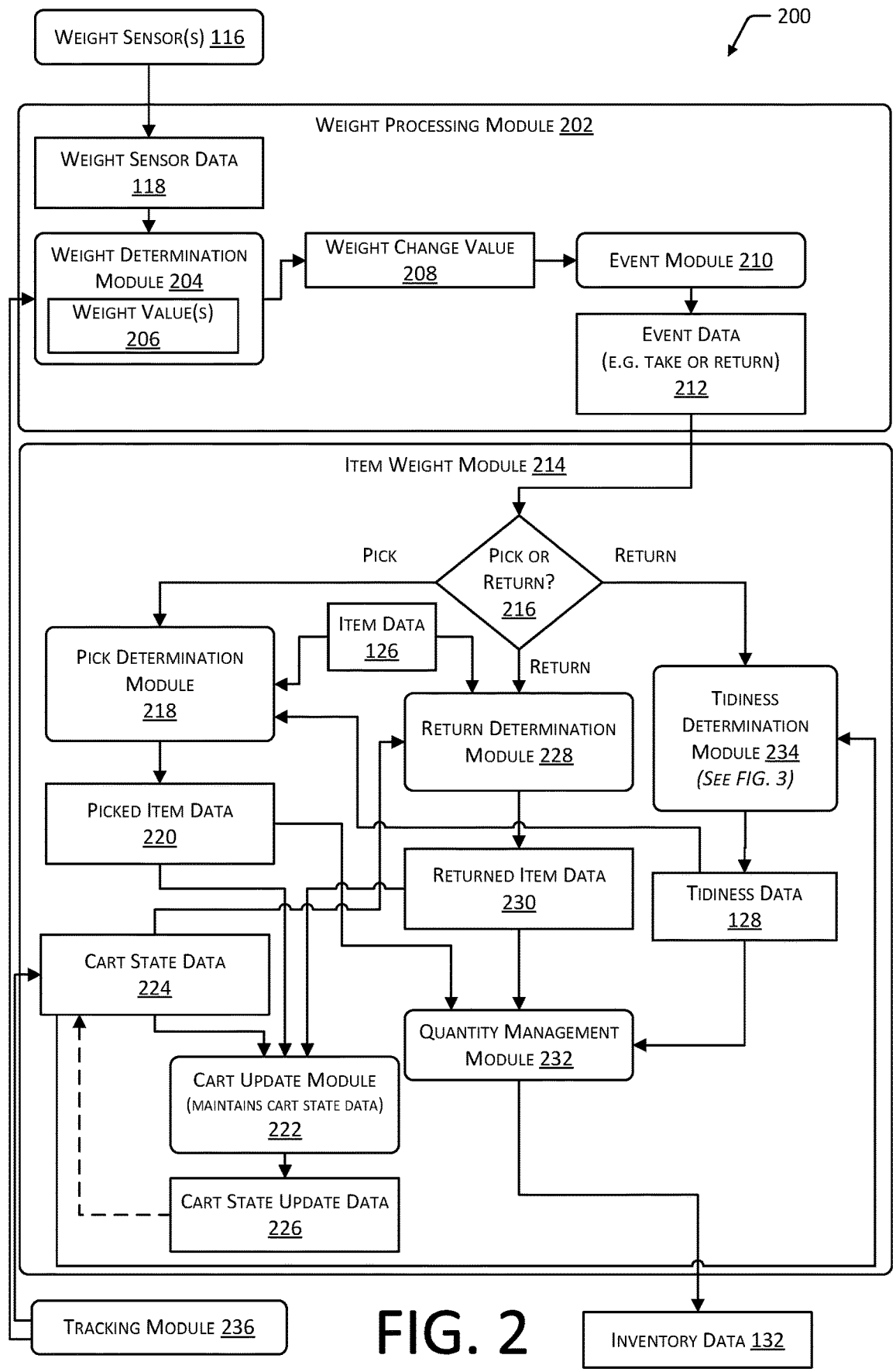
FIG. 2 illustrates a block diagram of a system for determining tidiness data that is indicative of whether an item has been returned to an assigned location, such as a lane on the shelf, according to some implementations.

FIG. 2 illustrates a block diagram 200 of a system for determining tidiness data 128 that is indicative of whether an item has been returned to an assigned location, such as a particular lane 104 on the shelf 102, according to some implementations. In the following figures, various modules are described for ease of illustration and not necessarily as a limitation. For example, one or more of the functions described with respect to one module may be performed by one or more other modules.

As described above, the weight sensor 116 generates weight sensor data 118. The inventory management system 120 may include a weight processing module 202. The weight processing module 202 accepts the weight sensor data 118 as input. A weight determination module 204 processes the weight sensor data 118 and produces weight values 206. For example, the weight sensor data 118 may comprise "raw" sensor output, such as a 16 bit binary value. The weight determination module 204 may process the weight sensor data 118 from one or more weight sensors 116 in various ways to produce weight values 206. For example, the weight value 206 may be based on an aggregate of weight sensor data 118 from a plurality of weight sensors 116.

In one implementation, the weight determination module 204 may apply one or more calibrations or corrections to the weight sensor data 118. For example, each individual weight sensor 116 may exhibit different output when measuring a known reference load, such as a known weight. Calibration data may be generated that provides one or more scaling factors to adjust for the particular variances of that specific weight sensor 116. For example, weight sensor 116(1) may read 5 grams above the actual weight, and so a scaling factor to subtract 5 grams may be applied to the weight sensor data 118 from weight sensor 116(1) to produce a calibrated weight output.

Other calibration data may be used to produce the weight values 206. In one implementation nonlinear compensation data representative of a nonlinear response by one or more weight sensors 116 may be applied to the weight sensor data 118. For example, the magnitude of the error in some weight sensors 116 may change based on the total load. Continuing the example, a lightly loaded weight sensor 116 may report weight sensor data 118 that is 7 grams less than the actual weight, but the same weight sensor 116 when heavily laden may read 29 grams less than the actual weight. The nonlinear compensation data may be represented as a mathematical function, lookup table, or other data structure, that allows for compensation and adjustment of the weight sensor data 118 as a function of the magnitude of the load on the weight sensor 116.

The weight determination module 204 may use other techniques as well. In one implementation, the weight determination module 204 may utilize a piecewise constant filter to determine when a change in weight has taken place. In another implementation the weight determination module 204 may utilize a variable number of samples of the weight sensor data 118 to determine the weight values 206. For example, the weight value 206 may comprise an average or other function of a number of samples of the weight sensor data 118. In one implementation, the weight determination module 204 may utilize a fixed number of samples to determine the weight value 206. In another implementation, the weight determination module 204 may utilize a variable number of samples to determine the weight value 206. For example, the weight determination module 204 may utilize the weight sensor data 118 since the last change in weight as determined by a piecewise constant filter to determine the weight value 206.

The weight determination module 204 may determine weight values 206 at different times and generate a weight change value 208. For example, a first weight value 206 corresponding to a first time may be subtracted from a second weight value 206 corresponding to a second time to determine the weight change value 208.

The weight processing module 202 may include an event module 210. The event module 210 may be configured to determine if an event such as a pick (take) or place (return) (place) of an item 106 has occurred and generate event data 212 indicative of this. A pick occurs when an item 106 is removed from an inventory location. A return or place of an item 106 occurs when an item is placed at the inventory location. For example, the event module 210 may compare the weight change value 208 with one or more thresholds to determine if an event has taken place. The event data 212 may include information such as the weight change value 208, data indicative of whether the event was a pick or return, and so forth. For example, the mathematical sign of the weight change value 208 may be used to indicate if the event was a pick or a return.

The event data 212 may be passed to an item weight module 214. The item weight module at 216 determines if the event is a pick or a return. For example, the event data 212 may include a weight change value 208 with a negative sign, such as "−391", indicating a pick of something from the inventory location measured by the weight sensor 116. In another example, if the event data 212 includes a weight change value 208 with a positive sign, such as "+391" it is deemed indicative of a return of something to the inventory location measured by the weight sensor 116.

If the event data 212 is indicative of a pick, the process may proceed to 218. At 218, a pick determination module 218 generates picked item data 220. The pick determination module 218 may access information such as a sample item weight value of an item 106 stowed at the inventory location for which the weight sensor data 118 is associated. For example, the item data 126 may be accessed. The weight change value 208 may be divided by this sample item weight value to determine a quantity of items 106 that were picked. The picked item data 220 may comprise information indicative of the item identifier associated with this item 106 and the quantity as taken.

The picked item data 220 may be provided to a cart update module 222. The cart update module 222 maintains cart state data 224 as events take place. The cart state data 224 may include information such as item identifiers indicative of particular items 106 that are deemed to be in the custody of the user 108 and the weight for each of those items 106. For example, the picked item data 220 may include the item identifier and the weight of the items 106 taken as indicated by the weight change value 208. This information may be used to generate cart state update data 226 which is then appended to the information in the cart state data 224.

In some situations, the weight change value 208 for a previous pick may be unavailable. For example, image-based processing may be used to determine the item 106 picked, the weight sensor data 118 may be deemed unreliable, and so forth. The assigned weight value associated with that item 106 in the cart state data 224 may be determined. This determination may include retrieval from the item data 126 of a sample item weight value or other weight information about the type of item that is associated with the particular inventory location at which the take event took place. This sample item weight value is then used as the assigned weight value for that item 106 in the cart state data 224.

With respect to 216, if the event data 212 is indicative of a return the process may proceed to one or more of 228 or 234. In the implementation depicted here, 228 and 234 may occur in parallel, while in other implementations the two may be combined into a linear process.

At 228, the return determination module 228 processes the event data 212 and generates returned item data 230. The return determination module 228 may compare the weight change value 208 with the cart state data 224, a sample item weight value in the item data 126, or other information to determine the type of item 106 and quantity returned. For example, If the cart state data 224 includes an item identifier of "Brand X dog food" with a weight of "393 grams", the return determination module 228 may generate returned item data 230 that indicates a return of the type of item 106 "Brand X dog food" took place at the inventory location associated with the weight sensor 116 that produced the weight sensor data 118.

A quantity management module 232 may utilize information such as the picked item data 220, returned item data 230, and so forth to generate the inventory data 132. For example, as items 106 are picked or returned as indicated by the picked item data 220 and the returned item data 230, the quantity on hand at the respective inventory locations as stored in the inventory data 132 may be adjusted.

As described above, when a return has been deemed to have taken place, the process may utilize the tidiness determination module 234. The tidiness determination module 234 is configured to generate the tidiness data 128. Operation of the tidiness determination module 234 is discussed in more detail below, such as in the discussion of FIG. 3.

The tidiness data 128 may be provided to one or more other modules. In one implementation, the tidiness data 128 may be provided to the pick determination module 218. For example, if the inventory location for which a pick has occurred is deemed to be untidy as indicated by the tidiness data 128, a confidence level of the picked item data 220 may be reduced compared to a pick from a tidy inventory location. In another example, the technique used to determine the picked item data 220 may be responsive to the tidiness data 128. Continuing the example, a pick from an inventory location deemed tidy by the tidiness data 128 may result in the picked item data 220 be determined based on the weight sensor data 118. However, a pick from an untidy inventory location may have the picked item data 220 determined using the weight sensor data 118 and other sensor data 124.

The quantity management module 232 may use the tidiness data 128 to maintain the inventory data 132. For example, an interaction with an inventory location which the tidiness data 128 indicates is untidy may result in inventory data 132 with a lower confidence value than one which is tidy. The quantity management module 232 may perform other actions, such as generating a dispatch for an attendant, robot, or other agency to correct an untidy inventory location.

The system 100 may utilize a tracking module 236 that maintains tracking information indicative of the location of a particular user 108, cart 110, or other objects within a facility. The tracking module 236 may utilize various techniques, such as tracking using electromagnetic signals, camera based tracking, and so forth to determine the location of an object in the facility. Tracking data from the tracking module 236 may be used by the system 100 to associate a particular user 108, or their associated user account, with an event at a particular inventory location. For example, if the event data 212 indicates a weight change at lane 104(1), and the tracking data indicates that user 108(1) is within a threshold distance of lane 104(1), the event data 212 may result in an update to the cart state data 224 that is associated with the user account of user 108(1). Continuing the example, event data 212 associated with a shelf 102 on the other side of the store would not affect the cart state data 224 for user 108(1).

Figure 3:
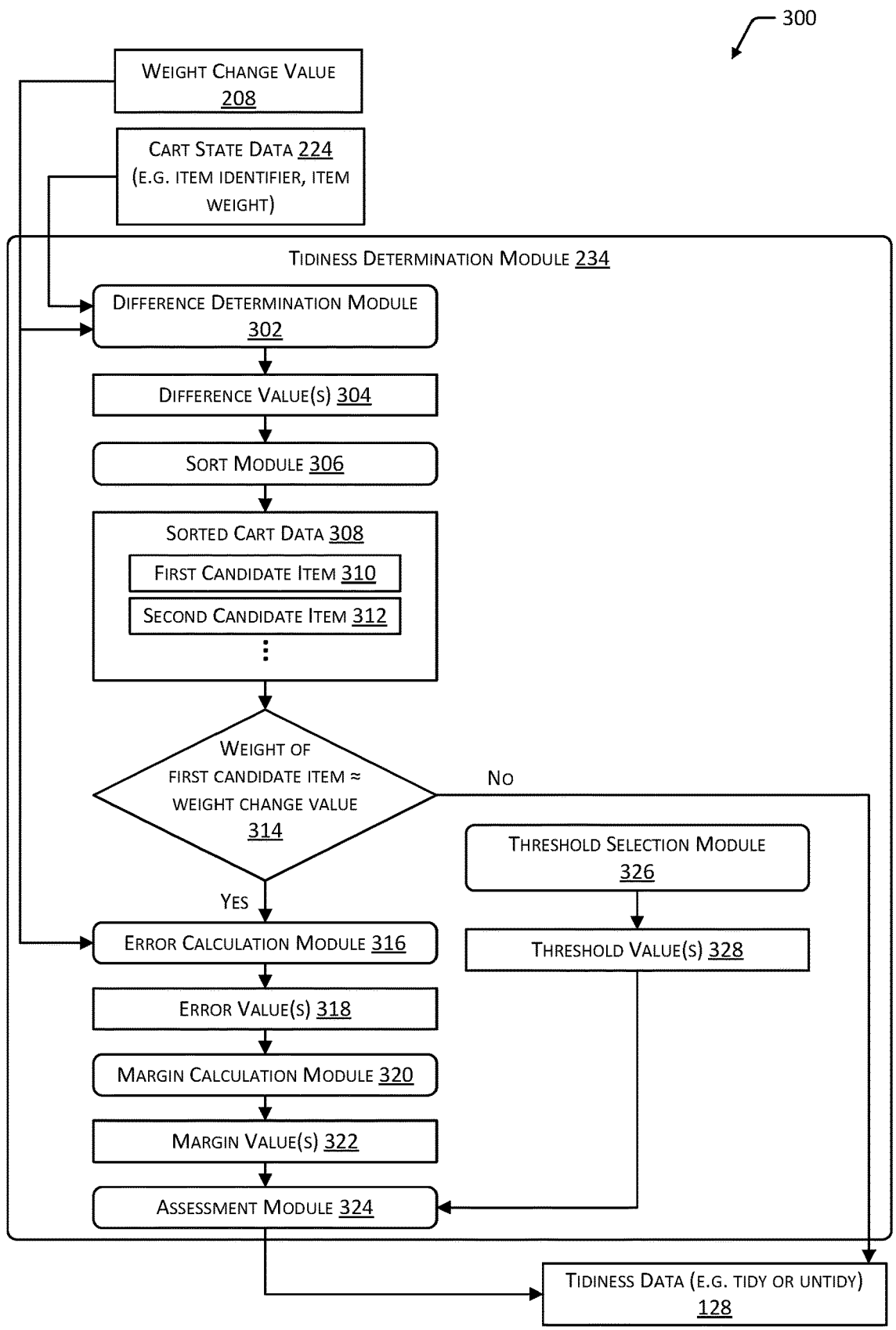
FIG. 3 illustrates a block diagram illustrating additional details of the determination of tidiness data, according to some implementations.

FIG. 3 illustrates a block diagram 300 of additional details of the determination of tidiness data 128, according to some implementations.

The tidiness determination module 234 may use as input the weight change value 208 and the cart state data 224. A difference determination module 302 generates a difference value 304 for each of the item identifiers in the cart state data 224. In one implementation, the difference value 304 may comprise an absolute value of the difference between the weight change value 208 and the weight of a particular item in the cart. For example, at a given point in time for a particular user 108, the cart state data 224 is indicative of the item identifier and the weight of items deemed to be in the custody of the user 108, such as in their hands or in their cart 110. The difference values 304 may be calculated for all of the item identifiers in the cart state data 224, with each difference value 304 associated with a particular pair of item identifier and weight of that item 106. For example, the cart state data 224 may be represented as a triplet of item identifier, weight, and difference value 304.

At 306, a sort module 306 may be used to generate sorted cart data 308, in which the triples are sorted in ascending order by the difference value 304. In other implementations the process may be configured to utilize a sort in descending order.

The sorted cart data 308 is then assessed to determine a first candidate item 310 that is in a first position of the sorted cart data 308. For example, the first candidate item 310 is the triplet having the lowest difference value 304. Likewise, a second candidate item 312 may be the triplet associated with the second position of the sorted cart data 308. The first candidate item 310 may be considered the "best guess" as to which item 106 was actually returned to the inventory location, with the assumption that the item returned is likely one that the user 108 previously had custody of, and thus appeared in the cart 110 and is represented in the cart state data 224.

In other implementations the sort module 306 may be omitted. Instead, a comparison between the triplets may be made to determine the individual triplet having the lowest or smallest difference value 304 which is designated as the first candidate item 310, the second lowest difference value 304 which is designated as the second candidate item 312, and so forth.

The determination of the first candidate item 310, second candidate item 312, and so forth, may be based on a determination of a confidence value that is indicative of a likelihood as to whether each of the item identifiers in the cart state data 224 was associated with the event at the inventory location. The implementation described above uses the difference values 304 as representative of this confidence value. A low difference value 304 may be deemed representative of a high likelihood or high confidence value.

In other implementations other metrics may be determined and used for the confidence value. For example, the confidence value may be based on statistical analysis of the weight sensor data 118, a confidence value associated with the weight values 206 or weight change values 208, and so forth. In another example, the confidence value may be based at least in part on other sensor data 124, such as image data obtained from a camera 122(1). Continuing the example, the difference value 304 for a particular item 106 in the cart state data 224 may be below a threshold and thus, on the basis of the weight change value 208 alone, is given a high confidence value. However, data from another sensor 122 that contradicts the weight change value 208, such as an indication that the user 108 was not present at the inventory location at the time of the event, may result in the confidence value for that particular item being decreased.

At 314, a determination is made as to whether the weight of the first candidate item 310 is equal to, or within a threshold value of, the weight change value 208. For example, the threshold value may be specified as a particular number of grams, a percentage, and so forth. Alternatively, in another implementation, the difference value 304 associated with the first candidate item 310 may be compared to a threshold value. For example, if the difference value 304 associated with the first candidate item 310 is less than a threshold value, the process may proceed to 316.

At 314, when the weight of the first candidate item 310 is not equal to, or exceeds the threshold value of, the weight change value 208, the process proceeds to generate tidiness data 128 that is indicative of an untidy return. For example, if the weight of the first candidate item 310 is 250 grams, and the weight change value 208 is 120 grams, the item 106 that was returned to lane 104(2) does not belong there, and is thus untidy.

If at 314 the weight of the first candidate item 310 is either equal to, or within the threshold value of the weight change value 208, the process proceeds to 316 for further assessment.

In some implementations, the determination of 314 may be omitted or incorporated into other determinations. For example, if the error calculation module 316 as described below determines an error value 318 that exceeds a threshold value, the process may proceed to 128 and generate tidiness data 128 that is indicative of an untidy return.

At 316, an error calculation module 316 is used to determine one or more error values 318, also designated as "E". The error calculation module 316 may determine the error value 318 by calculating an absolute value of a difference between the weight change value 208 (the weight of the returned item 106) and the weight associated with one of the candidate items. For example, a first error value 318 may be calculated as an absolute value of a difference between the weight change value 208 and the first candidate item weight (the weight associated with the first candidate item 310). Similarly, a second error value 318 may be calculated as an absolute value of a difference between the weight change value 208 and the second candidate item weight (the weight associated with the second candidate item 312). The error value 318 may be considered to provide an indication of how closely the weight change of the event matches the item 106 in the cart 110.

A margin calculation module 320 is used to determine a margin value 322, also designated as "μ". The margin calculation module 320 may determine the margin value 322 by calculating a difference between the first error value 318 and the second error value 318. The margin value 322 may be considered to provide an indication of how close the weight of one item 106 in the cart 110 is to another.

An assessment module 324 receives from a threshold selection module 326 one or more threshold values 328. One or more of the error values 318 or the margin values 322 may then be compared by the assessment module 324 to the threshold values 328 to determine the tidiness data 128. For example, if the first error value 318 is below a first threshold value, and the margin value 322 is greater than a second threshold value, the tidiness data 128 may be generated that is indicative of a "tidy" return in which the item 106 returned has a high confidence of being of the item type that is associated with that inventory location. This is because the relatively small first error value 318 suggests the item returned has a weight that is close to that of an item 106 in the cart 110, while the relatively large margin value 322 indicates a wide separation from the next closest possible item 106 in the cart 110.

The threshold value for the margin value 322 may be determined based at least in part on the expected measurement error of the weight sensors 116 used. For example, if the weight sensors 116 experience measurement errors of less than 11 grams, then the threshold value for the assessment of the margin value 322 may be "11". By setting the threshold value in this way, the system 100 reduces the likelihood of wrongly categorizing an untidy return as tidy.

The threshold selection module 326 may provide threshold values 328 that are either static or dynamically adjustable. For example, a static threshold value 328 may specify a single value for the first threshold value used to test the error value 318 and a single value for the second threshold value used to test the margin value 322. However, the threshold values 328 may change based on different conditions.

In one implementation, one or more of the threshold values 328 may be determined based on a time difference between events. For example, during quick picks and returns, the system 100 may experience increased noise in the weight sensor data 118. Continuing the example, some mechanical oscillation or "ringing" may occur in the weight sensors 116 or the attached fixture, such as a shelf. This may result in noisier weight sensor data 118, and thus less accurate weight values 206, with a corresponding decrease in the accuracy of the weight change value 208 calculated from those less accurate weight values 206. As a result, during high activity situations such as this, the threshold values 328 may be greater than during a low activity situation. In one implementation, a time difference may be calculated by subtracting a timestamp associated with a first event from a timestamp associated with a second event. The time difference may be compared to a time difference threshold to determine the threshold values 328.

In other implementations, one or more of the threshold values 328 may be determined based on the particular inventory location being assessed for tidiness. For example, a particular inventory location such as lane 104(2) may be more prone to untidy returns. As a result, the threshold selection module 326 may provide threshold values 328 that are less stringent to the assessment module 324 when assessing lane 104(2).

In still other implementations, one or more of the threshold values 328 may be determined based on the particular user 108, or their associated user account, associated with an event. For example, a particular user 108(1) may be prone to untidy returns, taking an item from one shelf 102 and placing it back on another shelf. The threshold selection module 326 may provide threshold values 328 that are specific to that user account, which may be different from the threshold values 328 associated with other users.

In still other implementations, one or more of the threshold values 328 may be determined based on reliability data. As described above, the weight sensors 116 generate weight sensor data 118, that is processed to determine weight values 206 and the weight change value 208. During operation of the system, reliability data may be obtained that provides information about operation of the system during acquisition of the weight sensor data 118. The reliability data information may be indicative of a measure of reliability of a particular weight value 206, weight change value 208, and so forth. For example, during the generation of the weight sensor data 118, or retroactively after receiving input from other portions of the system, such as other sensors 122, the weight values 206 associated with a particular inventory location may be deemed unreliable. As a result, the reliability data associated with that weight value 206 may be indicative of this unreliability. Continuing the example, as a result of the reliability that is below a threshold value, the threshold selection module 326 may select less restrictive threshold values 328. In comparison, if the reliability data indicates that one or more of the weight values 206 or the weight change value 208 has reliability exceeding the threshold value, the threshold selection module 326 may select more restrictive threshold values 328.

Various combinations of the above implementations may be used in conjunction with one another. For example, the threshold values 328 may be determined based on a time difference between events, inventory location for which tidiness is being determined, and the particular user 108 involved in the event. In other implementations, other techniques may be used to determine the threshold values 328. For example, the threshold values 328 may be determined based on the particular type of weight sensors 116 used, based on testing data, and so forth.

The tidiness determination module 234 may perform other functions during operation. In one implementation, prior to 302, a determination may be made as to whether the weight change value 208 is equal to, or within a threshold value of, the assigned weight value associated with the inventory location for which tidiness is being determined. If not, the process may proceed to generate tidiness data 128 that is indicative of an untidy return.

FIG. 4 illustrates block diagrams 400 of cart state data 224 and sorted cart state data 308, according to some implementations. The cart state data 224 and the sorted cart state data 308 are depicted in tabular form by way of illustration and not necessarily as a limitation. Other data structures may be used to store the information depicted here. In some implementations, the data structure of the cart state data 224 may differ from that of the sorted cart state data 308.

The cart state data 224 may include an item identifier 402, item weight 404, weight source 406, and other information. In some implementations, such as shown here, the cart state data 224 may include more than one entry for the same item identifier 402, such as if the user 108 has picked several of the same type of item 106. The item weight 404 comprises information indicative of the weight of the particular item designated by the item identifier 402. The item weight 404 may be an actual weight, such as obtained from a previous pick, or a retrieved weight, such as from the item data 126. For example, an actual weight of the item weight 404 may comprise the weight change value 208 from a previous pick of that item 106 from the inventory location. As illustrated here, because of natural variation, sensor fluctuations, and so forth, there two items of the same type as indicated by the item identifier of "38538918" have slightly different item weights 404.

If the actual item weight 404 is unavailable, the item weight 404 may be retrieved. For example, in the event of a failure of the weight sensors 116 at a particular inventory location, a pick may be determined based on other sensor data 124 but no weight change value 208 for that pick was determined. Continuing the example, the previously stored item weight 404 of a sample of that type of item may be retrieved and used as the item weight data 404.

In other implementations, the cart state data 224 may include additional information. For example, a confidence value associated with the item weight 404 may be stored. Continuing the example, the confidence value may be indicative of a likelihood that the item weight 404 is accurate.

Also shown is the sorted cart state data 308. In this illustration, a difference value 304 is shown that has been calculated for each item. For example, the difference value 304 may be generated by the difference determination module 302, as described above. In this illustration, the sorted cart state data 308 is sorted in ascending order by the difference value 304. The sorted cart state data 308 may include information such as a rank 408, indicative of the relative position within the sorted data of a particular item identifier 402. In this illustration, the item identifier 38538918 having a rank of 1 would be designated as the first candidate item 310.

Figure 5:
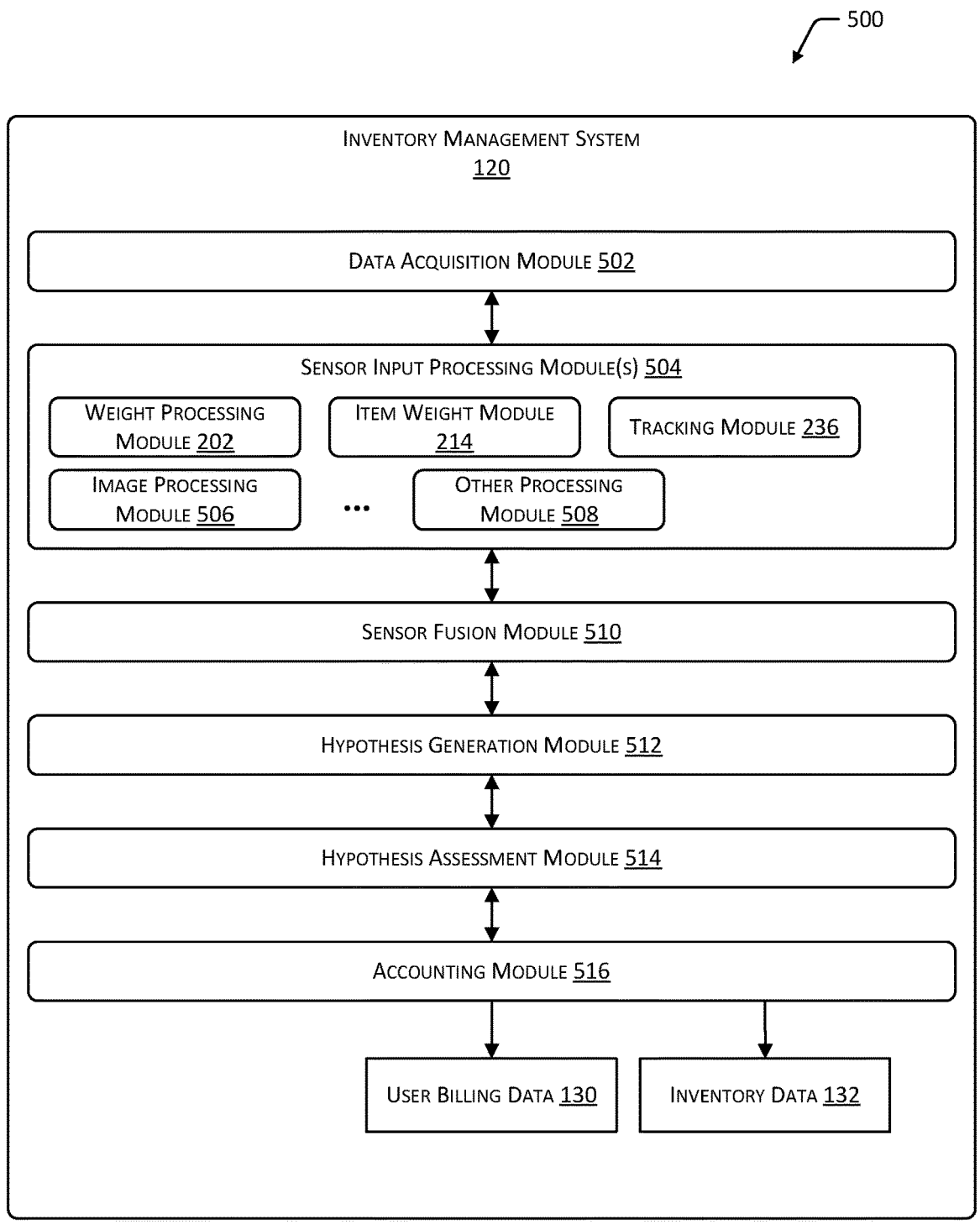
FIG. 5 illustrates a block diagram of the inventory management system, according to some implementations.

FIG. 5 illustrates a block diagram 500 of the inventory management system 120, according to some implementations.

The inventory management system 120 may include a data acquisition module 502. The data acquisition module 502 may be configured to accept sensor data from one or more sensors, such as the weight sensors 116 and other sensors 122.

The inventory management system 120 may include one or more sensor input processing modules 504. For example, these may include the weight processing module 202, the item weight module 214, the tracking module 236, an image processing module 506, or other processing modules 508. For example, the image processing module 506 may process other sensor data 124 such as image data. Processing of one or more of the image data or portions thereof may be performed by implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the other sensor data 124 or other data. For example, the ANN may be trained using a supervised learning algorithm such that object identifiers are associated with images of particular objects within training images provided to the ANN. Once trained, the ANN may be provided with the other sensor data 124 and the item data 126 to allow for a determination of similarity between two or more images.

A sensor fusion module 510 may use the sensor data from a plurality of sensors, or information derived therefrom, to generate information. For example, the sensor fusion module 510 may use information obtained from the item weight module 214 and the image processing module 506 to determine the tidiness data 128 of an inventory location. Continuing the example, when tidiness data 128 is indicative of an untidy return based on the weight sensor data 118, other sensor data 124 such as images of the inventory location may be processed to confirm if the return is actually untidy.

The inventory management system 120 may include a hypothesis generation module 512. The hypothesis generation module 512 may use information from the sensor input processing modules 504, the sensor fusion module 510, or other modules, to generate a hypothesis about the event taking place in the facility. For example, the hypothesis generation module 512 may generate, based on the weight sensor data 118, several hypotheses about what items 106 were picked or placed at a particular inventory location. Continuing the example, a pick or place involving a weight change value 208 that differs from a single item may result in various hypotheses such as a) quantity x of the same type of item was returned, b) quantity x of type of item y and quantity x of type of item w was returned, and so forth.

At 514 the hypothesis assessment module 514 may utilize the output from the hypothesis generation module 512 and other modules to determine which hypothesis of those generated most likely represents the actual event in the facility. For example, the hypothesis assessment module 514 may utilize output from the sensor fusion module 510 to determine that the return was of a single type of item, and thus those hypotheses involving different types of items may be removed from consideration. Once a particular hypothesis has been determined as meeting a threshold confidence value, the hypothesis may be deemed to represent the actual event.

An accounting module 516 may use the information from the hypothesis assessment module 514 to generate information such as the user billing data 130, the inventory data 132, and so forth. For example, based on the determination that the user 108 took two cans of item 106(2) and then returned one of these cans, the account of user 108 may be billed for a single can of item 106(2). Likewise, the inventory data 132 may be updated to include information that is representative of the change of quantity on hand at the inventory location associated with the pick and return.

Figure 6:
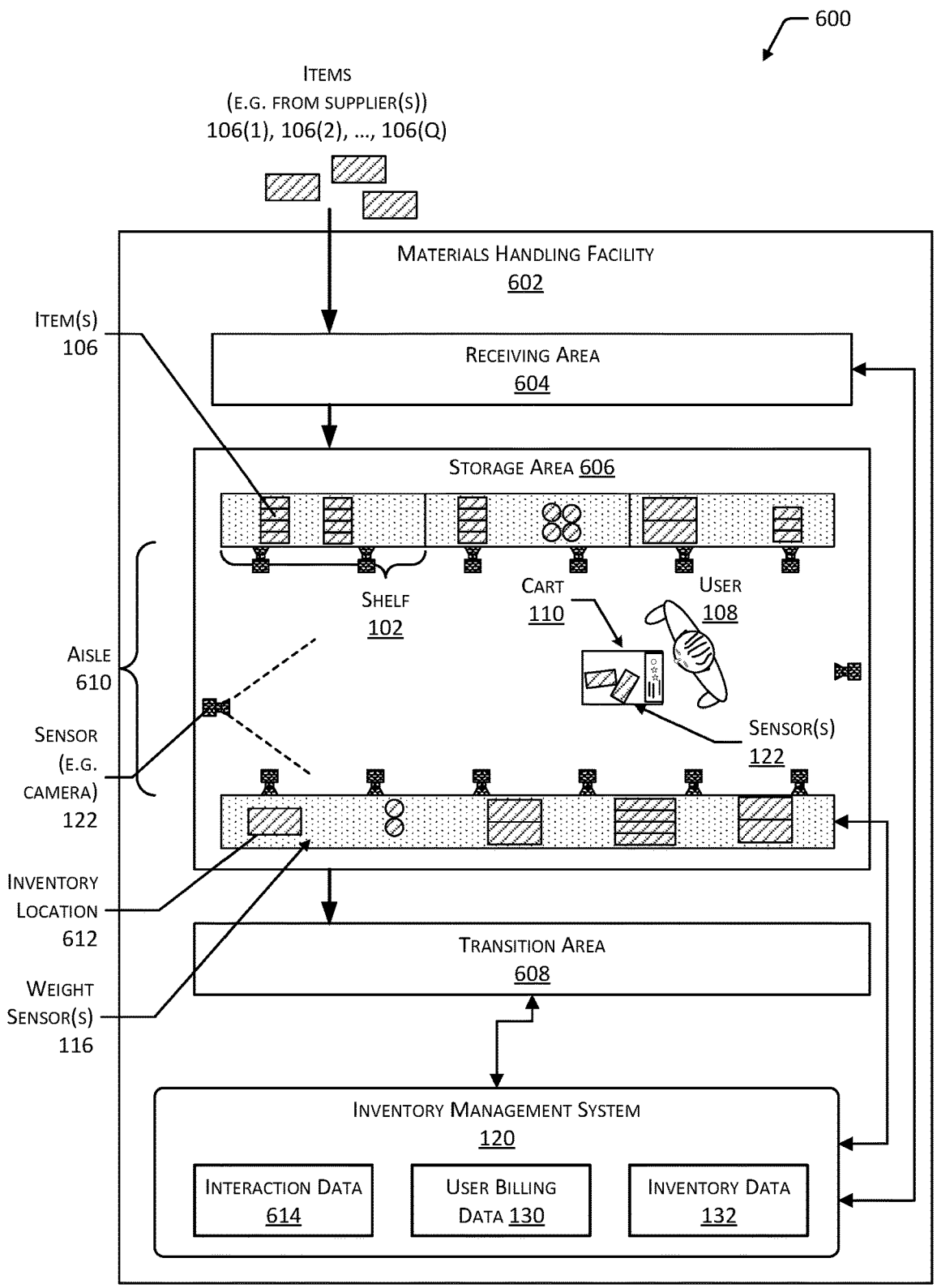
FIG. 6 is a block diagram illustrating a materials handling facility (facility) using the system, according to some implementations.

FIG. 6 is a block diagram 600 illustrating a materials handling facility (facility) 602 using the system 100, according to some implementations. A facility 602 comprises one or more physical structures or areas within which one or more items 106(1), 106(2), . . . , 106(Q) may be held. As used in this disclosure, letters in parenthesis such as "(Q)" indicate an integer value greater than or equal to zero. The items 106 may comprise physical goods, such as books, pharmaceuticals, repair parts, electronic gear, and so forth.

The facility 602 may include one or more areas designated for different functions with regard to inventory handling. In this illustration, the facility 602 includes a receiving area 604, a storage area 606, and a transition area 608.

The receiving area 604 may be configured to accept items 106, such as from suppliers, for intake into the facility 602. For example, the receiving area 604 may include a loading dock at which trucks or other freight conveyances unload the items 106. In some implementations, the items 106 may be processed, at the receiving area 604, to generate at least a portion of the item data 126. For example, an item 106 may be weighed, imaged or otherwise scanned to develop reference images or representations of the item 106 at the receiving area 604.

The storage area 606 is configured to store the items 106. The storage area 606 may be arranged in various physical configurations. In one implementation, the storage area 606 may include one or more aisles 610. The aisle 610 may be configured with, or defined by, inventory locations 612 on one or both sides of the aisle 610. The inventory locations 612 may include one or more of a shelf 102, a rack, a case, a cabinet, a bin, a floor location, or other suitable storage mechanisms for holding, supporting, or storing the items 106. For example, the inventory locations 612 may comprise shelves 102 with lanes 104 designated therein. The inventory locations 612 may be affixed to the floor or another portion of the structure of the facility 602. The inventory locations 612 may also be movable such that the arrangements of aisles 610 may be reconfigurable. In some implementations, the inventory locations 612 may be configured to move independently of an outside operator. For example, the inventory locations 612 may comprise a rack with a power source and a motor, operable by a computing device to allow the rack to move from one location within the facility 602 to another.

One or more users 108 and carts 110 or other material handling apparatus may move within the facility 602. For example, the user 108 may move about within the facility 602 to pick or place the items 106 in various inventory locations 612, placing them in the cart 110 for ease of transport. The cart 110 is configured to carry or otherwise transport one or more items 106. For example, the cart 110 may include a basket, bag, bin, and so forth. In other implementations, other material handling apparatuses such as robots, forklifts, cranes, aerial drones, and so forth, may move about the facility 602 picking, placing, or otherwise moving the items 106. For example, a robot may pick an item 106 from a first inventory location 612(1) and move the item 106 to a second inventory location 612(2).

While the storage area 606 is depicted as having one or more aisles 610, inventory locations 612 storing the items 106, sensors 122, and so forth, it is understood that the receiving area 604, the transition area 608, or other areas of the facility 602 may be similarly equipped. Furthermore, the arrangement of the various areas within the facility 602 is depicted functionally rather than schematically. For example, in some implementations, multiple different receiving areas 604, storage areas 606, and transition areas 608 may be interspersed rather than segregated in the facility 602.

The facility 602 may include, or be coupled to, the inventory management system 120 described above. The inventory management system 120 is configured to interact with users 108 or devices such as sensors 122, robots, material handling equipment, computing devices, and so forth, in one or more of the receiving area 604, the storage area 606, or the transition area 608.

During operation of the facility 602, the weight sensors 116 and other sensors 122 may be configured to provide sensor data, or information based on the sensor data, to the inventory management system 120. The sensor data may include image data, non-image data, weight sensor data obtained from weight sensors 116, and so forth. The sensors 122 may include, but are not limited to, cameras 122(1), depth sensors 122(2), optical sensor arrays 122(13), proximity sensors 122(14), and so forth. The sensors 122 may be stationary or mobile, relative to the facility 602. For example, the inventory locations 612 may contain weight sensors 116 to acquire weight sensor data 118 of items 106 stowed therein, cameras 122(1) to acquire images of picking or placement of items 106 on shelves 102, optical sensor arrays 122(13) to detect shadows of the user's 108 hands at the inventory locations 612, and so forth. In another example, the facility 602 may include cameras 122(1) to obtain images of the user 108 or other objects in the facility 602. The sensors 122 are described in more detail below with regard to FIG. 7.

The inventory management system 120 or other systems may use the sensor data to track the location of objects within the facility 602, movement of the objects, or provide other functionality. Objects may include, but are not limited to, items 106, users 108, carts 110, and so forth. For example, a series of images acquired by the camera 122(1) may indicate removal by the user 108 of an item 106 from a particular location on the inventory location 612 and placement of the item 106 on or at least partially within the cart 110.

The facility 602 may be configured to receive different kinds of items 106 from various suppliers and to store them until a customer orders or retrieves one or more of the items 106. A general flow of items 106 through the facility 602 is indicated by the arrows of FIG. 6. Specifically, as illustrated in this example, items 106 may be received from one or more suppliers, such as manufacturers, distributors, wholesalers, and so forth, at the receiving area 604. In various implementations, the items 106 may include merchandise, commodities, perishables, or any suitable type of item 106, depending on the nature of the enterprise that operates the facility 602.

Upon being received from a supplier at the receiving area 604, the items 106 may be prepared for storage in the storage area 606. For example, in some implementations, items 106 may be unpacked or otherwise rearranged. The inventory management system 120 may include one or more software applications executing on a computer system to provide inventory management functions. These inventory management functions may include maintaining information indicative of the type, quantity, condition, cost, location, weight, or any other suitable parameters with respect to the items 106. The items 106 may be stocked, managed, or dispensed in terms of countable units, individual units, or multiple units, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of a measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 604, items 106 may be stored within the storage area 606. In some implementations, like items 106 may be stored or displayed together in the inventory locations 612 such as in bins, on shelves 102, hanging from pegboards, and so forth. In this implementation, all items 106 of a given kind are stored in one inventory location 612. In other implementations, like items 106 may be stored in different inventory locations 612. For example, to optimize retrieval of certain items 106 having frequent turnover within a large physical facility 602, those items 106 may be stored in several different inventory locations 612 to reduce congestion that might occur at a single inventory location 612.

When a customer order specifying one or more items 106 is received, or as a user 108 progresses through the facility 602, the corresponding items 106 may be selected or "picked" from the inventory locations 612 containing those items 106. In various implementations, item picking may range from manual to completely automated picking. For example, in one implementation, a user 108 may have a list of items 106 they desire and may progress through the facility 602 picking items 106 from inventory locations 612 within the storage area 606 and placing those items 106 into a cart 110. In other implementations, employees of the facility 602 may pick items 106 using written or electronic pick lists derived from customer orders. These picked items 106 may be placed into the cart 110 as the employee progresses through the facility 602.

After items 106 have been picked, the items 106 may be processed at a transition area 608. The transition area 608 may be any designated area within the facility 602 where items 106 are transitioned from one location to another or from one entity to another. For example, the transition area 608 may be a packing station within the facility 602. When the item 106 arrives at the transition area 608, the item 106 may be transitioned from the storage area 606 to the packing station. Information about the transition may be maintained by the inventory management system 120.

In another example, if the items 106 are departing the facility 602, a list of the items 106 may be obtained and used by the inventory management system 120 to transition responsibility for, or custody of, the items 106 from the facility 602 to another entity. For example, a carrier may accept the items 106 for transport with that carrier accepting responsibility for the items 106 indicated in the list. In another example, a user 108 may purchase or rent the items 106 and remove the items 106 from the facility 602. During use of the facility 602, the user 108 may move about the facility 602 to perform various tasks, such as picking or placing the items 106 in the inventory locations 612.

To facilitate operation of the facility 602, the inventory management system 120 is configured to use the sensor data including the weight sensor data 118, image data and other information such as the item data 126, the physical layout data, and so forth, to generate interaction data 614. For example, the confidence level associated with a determination that the user 108 has a particular item 106 in their cart 110 may be based on the tidiness data 128 associated with the inventory location 612 they are interacting with.

The interaction data 614 may provide information about an interaction, such as a pick of an item 106 from the inventory location 612, a place of an item 106 to the inventory location 612, a touch made to an item 106 at the inventory location 612, a gesture associated with an item 106 at the inventory location 612, and so forth. The interaction data 614 may include one or more of the type of interaction, interaction location identifier indicative of where from the inventory location 612 the interaction took place, item identifier, quantity change to the item 106, user identifier, and so forth. The interaction data 614 may then be used to further update the item data 126. For example, the quantity of items 106 on hand at a particular lane 104 on the shelf 102 may be changed based on an interaction that picks or places one or more items 106.

The inventory management system 120 may combine or otherwise utilize data from different sensors 122 of different types during operation. For example, weight data obtained from weight sensors 116 at the inventory location 612 may be used instead of, or in conjunction with, the image data to determine the interaction data 614.

As described above, the inventory management system 120 may perform other operations, such as determining user billing data 130, determining inventory data 132, and so forth.

By using the tidiness data 128, the inventory management system 120 may be able to more accurately operate the facility 602. For example, the interaction data 614 for an untidy lane 114 may be rated as having a lower confidence value or as being less certain than the interaction data 614 for a tidy lane 112.

Figure 7:
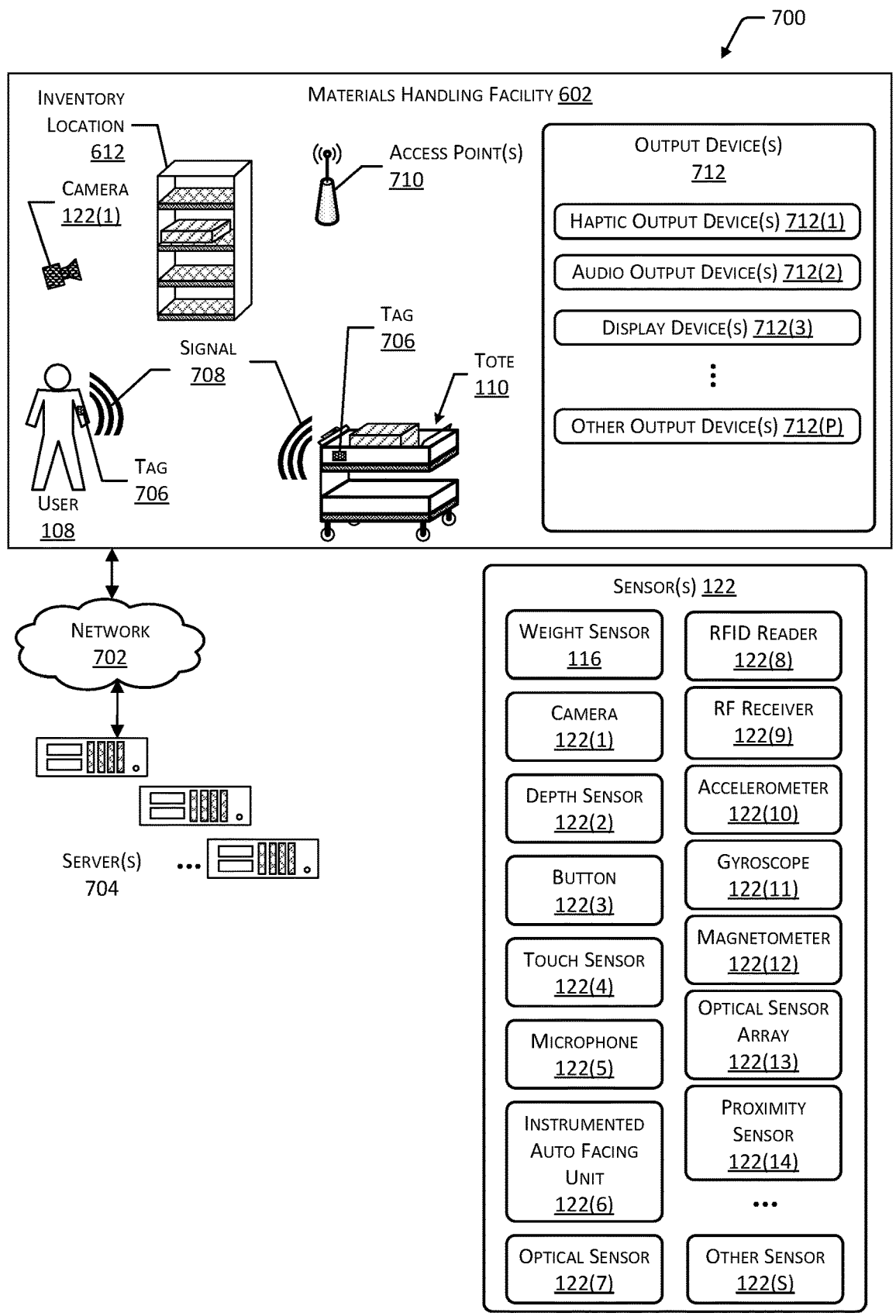
FIG. 7 is a block diagram illustrating additional details of the facility, according to some implementations.

FIG. 7 is a block diagram 700 illustrating additional details of the facility 602, according to some implementations. The facility 602 may be connected to one or more networks 702, which in turn connect to one or more servers 704. The network 702 may include private networks such as an institutional or personal intranet, public networks such as the Internet, or a combination thereof. The network 702 may utilize wired technologies (e.g., wires, fiber optic cables, and so forth), wireless technologies (e.g., radio frequency, infrared, acoustic, optical, and so forth), or other connection technologies. The network 702 is representative of any type of communication network, including one or more of data networks or voice networks. The network 702 may be implemented using wired infrastructure (e.g., copper cable, fiber optic cable, and so forth), a wireless infrastructure (e.g., cellular, microwave, satellite, and so forth), or other connection technologies.

The servers 704 may be configured to execute one or more modules or software applications associated with the inventory management system 120 or other systems. While the servers 704 are illustrated as being in a location outside of the facility 602, in other implementations, at least a portion of the servers 704 may be located at the facility 602. The servers 704 are discussed in more detail below with regard to FIG. 8.

The users 108, the carts 110, or other objects in the facility 602 may be equipped with one or more tags 706. The tags 706 may be configured to emit a signal 708. In one implementation, the tag 706 may be a radio frequency identification (RFID) tag 706 configured to emit an RF signal 708 upon activation by an external signal. For example, the external signal may comprise a radio frequency signal or a magnetic field configured to energize or activate the RFID tag 706. In another implementation, the tag 706 may comprise a transmitter and a power source configured to power the transmitter. For example, the tag 706 may comprise a Bluetooth Low Energy (BLE) transmitter and battery. In other implementations, the tag 706 may use other techniques to indicate presence of the tag 706. For example, an acoustic tag 706 may be configured to generate an ultrasonic signal 708, which is detected by corresponding acoustic receivers. In yet another implementation, the tag 706 may be configured to emit an optical signal 708.

The inventory management system 120 may be configured to use the tags 706 for one or more of identification of the object, determining a location of the object, and so forth. For example, the users 108 may wear tags 706, the carts 110 may have tags 706 affixed, and so forth, which may be read and, based at least in part on signal strength, used to determine identity and location.

Generally, the inventory management system 120 or other systems associated with the facility 602 may include any number and combination of input components, output components, and servers 704.

The one or more sensors 122 may be arranged at one or more locations within the facility 602. For example, the sensors 122 may be mounted on or within a floor, wall, at a ceiling, at an inventory location 612, on a cart 110, may be carried or worn by a user 108, and so forth.

The one or more weight sensors 116 are configured to measure the weight of a load, such as the item 106, the cart 110, or other objects. The weight sensors 116 may be configured to measure the weight of the load at one or more of the inventory locations 612, the cart 110, on the floor of the facility 602, and so forth. For example, the shelf 102 may include a plurality of lanes 104 or platforms, with one or more weight sensors 116 beneath each one to provide weight sensor data 118 about an individual lane 104 or platform. The weight sensors 116 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 116 may operate as transducers that generate one or more signals based on an applied force, such as that of the load due to gravity. For example, the weight sensor 116 may comprise a load cell having a strain gauge and a structural member that deforms slightly when weight is applied. By measuring a change in the electrical characteristic of the strain gauge, such as capacitance or resistance, the weight may be determined. In another example, the weight sensor 116 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 120 may use the data acquired by the weight sensors 116 to identify an object, determine a change in the quantity of objects, determine a location of an object, maintain shipping records, and so forth.

The sensors 122 may include one or more cameras 122(1) or other imaging sensors. The one or more cameras 122(1) may include imaging sensors configured to acquire images of a scene. The cameras 122(1) are configured to detect light in one or more wavelengths including, but not limited to, terahertz, infrared, visible, ultraviolet, and so forth. The cameras 122(1) may comprise charge coupled devices (CCD), complementary metal oxide semiconductor (CMOS) devices, microbolometers, and so forth. The inventory management system 120 may use image data acquired by the cameras 122(1) during operation of the facility 602. For example, the inventory management system 120 may identify items 106, users 108, carts 110, and so forth, based at least in part on their appearance within the image data acquired by the cameras 122(1). The cameras 122(1) may be mounted in various locations within the facility 602. For example, cameras 122(1) may be mounted overhead, on inventory locations 612, may be worn or carried by users 108, may be affixed to carts 110, and so forth.

One or more depth sensors 122(2) may also be included in the sensors 122. The depth sensors 122(2) are configured to acquire spatial or three-dimensional (3D) data, such as depth information, about objects within a FOV. The depth sensors 122(2) may include range cameras, lidar systems, sonar systems, radar systems, structured light systems, stereo vision systems, optical interferometry systems, and so forth. The inventory management system 120 may use the 3D data acquired by the depth sensors 122(2) to identify objects, determine a location of an object in 3D real space, and so forth.

One or more buttons 122(3) may be configured to accept input from the user 108. The buttons 122(3) may comprise mechanical, capacitive, optical, or other mechanisms. For example, the buttons 122(3) may comprise mechanical switches configured to accept an applied force from a touch of the user 108 to generate an input signal. The inventory management system 120 may use data from the buttons 122(3) to receive information from the user 108. For example, the cart 110 may be configured with a button 122(3) to accept input from the user 108 and send information indicative of the input to the inventory management system 120.

The sensors 122 may include one or more touch sensors 122(4). The touch sensors 122(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 120 may use data from the touch sensors 122(4) to receive information from the user 108. For example, the touch sensor 122(4) may be integrated with the cart 110 to provide a touchscreen with which the user 108 may select from a menu one or more particular items 106 for picking, enter a manual count of items 106 at an inventory location 612, and so forth.

One or more microphones 122(5) may be configured to acquire information indicative of sound present in the environment. In some implementations, arrays of microphones 122(5) may be used. These arrays may implement beamforming techniques to provide for directionality of gain. The inventory management system 120 may use the one or more microphones 122(5) to acquire information from acoustic tags 706, accept voice input from the users 108, determine ambient noise level, and so forth.

The sensors 122 may include instrumented auto facing units (IAFUs) 122(6). The IAFU 122(6) may comprise a position sensor configured to provide data indicative of displacement of a pusher. As an item 106 is removed from the IAFU 122(6), the pusher moves, such as under the influence of a spring, and pushes the remaining items 106 in the IAFU 122(6) to the front of the inventory location 612. By using data from the position sensor, and given item data 126 such as a depth of an individual item 106, a count may be determined, based on a change in position data. For example, if each item 106 is 1 inch deep, and the position data indicates a change of 7 inches, the quantity held by the IAFU 122(6) may have changed by 7 items 106. This count information may be used to confirm or provide a cross check for a count obtained by other means, such as analysis of the weight sensor data 118.

The sensors 122 may include one or more optical sensors 122(7). The optical sensors 122(7) may be configured to provide data indicative of one or more of color or intensity of light impinging thereupon. For example, the optical sensor 122(7) may comprise a photodiode and associated circuitry configured to generate a signal or data indicative of an incident flux of photons. As described below, the optical sensor array 122(13) may comprise a plurality of the optical sensors 122(7). The optical sensors 122(7) may include photodiodes, photoresistors, photovoltaic cells, quantum dot photoconductors, bolometers, pyroelectric infrared detectors, and so forth. For example, the optical sensor 122(7) may use germanium photodiodes to detect infrared light.

One or more radio frequency identification (RFID) readers 122(8), near field communication (NFC) systems, and so forth, may be included as sensors 122. For example, the RFID readers 122(8) may be configured to read the RF tags 706. Information acquired by the RFID reader 122(8) may be used by the inventory management system 120 to identify an object associated with the RF tag 706 such as the item 106, the user 108, the cart 110, and so forth. For example, based on information from the RFID readers 122(8) detecting the RF tag 706 at different times and RFID readers 122(8) having different locations in the facility 602, a velocity of the RF tag 706 may be determined.

One or more RF receivers 122(9) may also be included as sensors 122. In some implementations, the RF receivers 122(9) may be part of transceiver assemblies. The RF receivers 122(9) may be configured to acquire RF signals 708 associated with Wi-Fi, Bluetooth, ZigBee, 2G, 3G, 4G, LTE, or other wireless data transmission technologies. The RF receivers 122(9) may provide information associated with data transmitted via radio frequencies, signal strength of RF signals 708, and so forth. For example, information from the RF receivers 122(9) may be used by the inventory management system 120 to determine a location of an RF source, such as a communication interface onboard the cart 110.

The sensors 122 may include one or more accelerometers 122(10), which may be worn or carried by the user 108, mounted to the cart 110, and so forth. The accelerometers 122(10) may provide information such as the direction and magnitude of an imposed acceleration. Data such as rate of acceleration, determination of changes in direction, speed, and so forth, may be determined using the accelerometers 122(10).

A gyroscope 122(11) may provide information indicative of rotation of an object affixed thereto. For example, the cart 110 or other objects may be equipped with a gyroscope 122(11) to provide data indicative of a change in orientation of the object.

A magnetometer 122(12) may be used to determine an orientation by measuring ambient magnetic fields, such as the terrestrial magnetic field. The magnetometer 122(12) may be worn or carried by the user 108, mounted to the cart 110, and so forth. For example, the magnetometer 122(12) mounted to the cart 110 may act as a compass and provide information indicative of which direction the cart 110 is oriented.

An optical sensor array 122(13) may comprise one or optical sensors 122(7). The optical sensors 122(7) may be arranged in a regular, repeating, or periodic two-dimensional arrangement such as a grid. The optical sensor array 122(13) may generate image data. For example, the optical sensor array 122(13) may be arranged within or below an inventory location 612 and obtain information about shadows of items 106, hand of the user 108, and so forth.

The sensors 122 may include proximity sensors 122(14) used to determine presence of an object, such as the user 108, the cart 110, and so forth. The proximity sensors 122(14) may use optical, electrical, ultrasonic, electromagnetic, or other techniques to determine a presence of an object. In some implementations, the proximity sensors 122(14) may use an optical emitter and an optical detector to determine proximity. For example, an optical emitter may emit light, a portion of which may then be reflected by the object back to the optical detector to provide an indication that the object is proximate to the proximity sensor 122(14). In other implementations, the proximity sensors 122(14) may comprise a capacitive proximity sensor 122(14) configured to provide an electrical field and determine a change in electrical capacitance due to presence or absence of an object within the electrical field.

The proximity sensors 122(14) may be configured to provide sensor data indicative of one or more of a presence or absence of an object, a distance to the object, or characteristics of the object. An optical proximity sensor 122(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 122 such as a camera 122(1). Based on an apparent distance between the features of the structured light pattern, the distance to the object may be calculated. Other techniques may also be used to determine distance to the object. In another example, the color of the reflected light may be used to characterize the object, such as skin, clothing, cart 110, and so forth.

The sensors 122 may include other sensors 122(S) as well. For example, the other sensors 122(S) may include smart floors, light curtains, ultrasonic rangefinders, thermometers, barometric sensors, hygrometers, and so forth. For example, smart floors may utilize one or more of transmitters or receivers of electromagnetic signals positioned in or beneath a floor to determine one or more of location or identification of an object within the facility.

In some implementations, the camera 122(1) or other sensors 122(S) may include hardware processors, memory, and other elements configured to perform various functions. For example, the cameras 122(1) may be configured to generate image data, send the image data to another device such as the server 704, and so forth.

The facility 602 may include one or more access points 710 configured to establish one or more wireless networks. The access points 710 may use Wi-Fi, NFC, Bluetooth, or other technologies to establish wireless communications between a device and the network 702. The wireless networks allow the devices to communicate with one or more of the sensors 122, the inventory management system 120, the tag 706, a communication device of the cart 110, or other devices.

Output devices 712 may also be provided in the facility 602. The output devices 712 are configured to generate signals, which may be perceived by the user 108 or detected by the sensors 122. In some implementations, the output devices 712 may be used to provide illumination of the optical sensor array 122(13).

Haptic output devices 712(1) are configured to provide a signal that results in a tactile sensation to the user 108. The haptic output devices 712(1) may use one or more mechanisms such as electrical stimulation or mechanical displacement to provide the signal. For example, the haptic output devices 712(1) may be configured to generate a modulated electrical signal, which produces an apparent tactile sensation in one or more fingers of the user 108. In another example, the haptic output devices 712(1) may comprise piezoelectric or rotary motor devices configured to provide a vibration, which may be felt by the user 108.

One or more audio output devices 712(2) may be configured to provide acoustic output. The acoustic output includes one or more of infrasonic sound, audible sound, or ultrasonic sound. The audio output devices 712(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 712(3) may be configured to provide output, which may be seen by the user 108 or detected by a light-sensitive sensor such as a camera 122(1) or an optical sensor 122(7). In some implementations, the display devices 712(3) may be configured to produce output in one or more of infrared, visible, or ultraviolet light. The output may be monochrome or in color. The display devices 712(3) may be one or more of emissive, reflective, microelectromechanical, and so forth. An emissive display device 712(3), such as using LEDs, is configured to emit light during operation. In comparison, a reflective display device 712(3), such as using an electrophoretic element, relies on ambient light to present an image. Backlights or front lights may be used to illuminate non-emissive display devices 712(3) to provide visibility of the output in conditions where the ambient light levels are low.

The display devices 712(3) may be located at various points within the facility 602. For example, the addressable displays may be located on inventory locations 612, carts 110, on the floor of the facility 602, and so forth.

Other output devices 712(P) may also be present. For example, the other output devices 712(P) may include scent/odor dispensers, document printers, 3D printers or fabrication equipment, and so forth.

Figure 8:
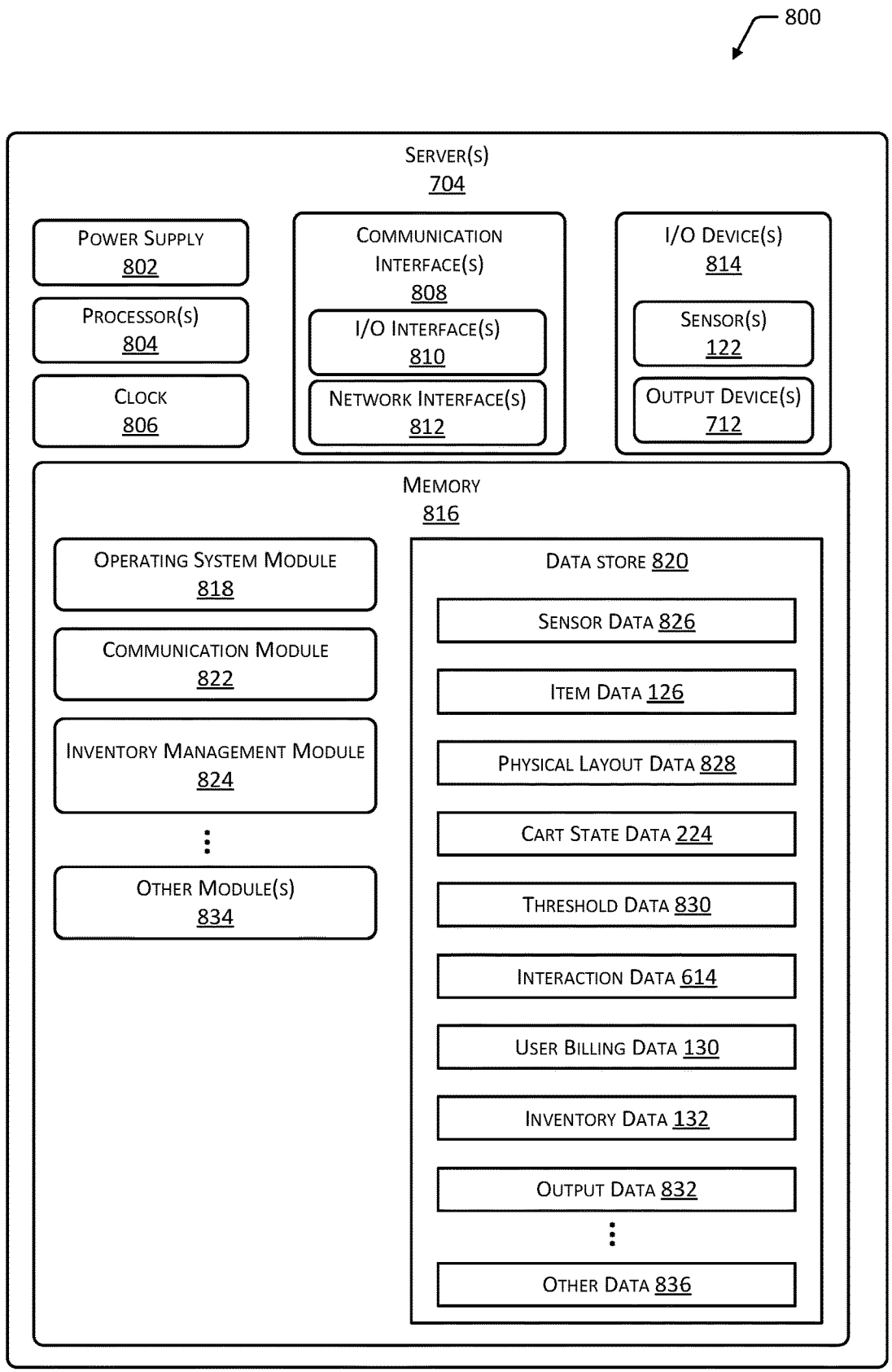
FIG. 8 is a block diagram of a server to support operation of the facility, according to some implementations.

FIG. 8 illustrates a block diagram 800 of a server 704 configured to support operation of the facility 602, according to some implementations. The server 704 may be physically present at the facility 602, may be accessible by the network 702, or a combination of both. The server 704 does not require end-user knowledge of the physical location and configuration of the system that delivers the services. Common expressions associated with the server 704 may include "on-demand computing", "software as a service (SaaS)", "platform computing", "network-accessible platform", "cloud services", "data centers", and so forth. Services provided by the server 704 may be distributed across one or more physical or virtual devices.

One or more power supplies 802 may be configured to provide electrical power suitable for operating the components in the server 704. The one or more power supplies 802 may comprise batteries, capacitors, fuel cells, photovoltaic cells, wireless power receivers, conductive couplings suitable for attachment to an external power source such as provided by an electric utility, and so forth. The server 704 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The server 704 may include one or more communication interfaces 808 such as input/output (I/O) interfaces 810, network interfaces 812, and so forth. The communication interfaces 808 enable the server 704, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 122, keyboard, mouse, scanner, and so forth. The I/O devices 814 may also include output devices 712 such as one or more of a display device 712(3), printer, audio speakers, and so forth. In some embodiments, the I/O devices 814 may be physically incorporated with the server 704 or may be externally placed.

The network interfaces 812 may be configured to provide communications between the server 704 and other devices, such as the carts 110, routers, access points 710, and so forth. The network interfaces 812 may include devices configured to couple to personal area networks (PANs), local area networks (LANs), wireless local area networks (WLANS), wide area networks (WANs), and so forth. For example, the network interfaces 812 may include devices compatible with Ethernet, Wi-Fi, Bluetooth, ZigBee, and so forth.

The server 704 may also include one or more buses or other internal communications hardware or software that allow for the transfer of data between the various modules and components of the server 704.

As shown in FIG. 8, the server 704 includes one or more memories 816. The memory 816 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 816 provides storage of computer-readable instructions, data structures, program modules, and other data for the operation of the server 704. A few example functional modules are shown stored in the memory 816, although the same functionality may alternatively be implemented in hardware, firmware, or as a system on a chip (SoC).

The memory 816 may include at least one operating system (OS) module 818. The OS module 818 is configured to manage hardware resource devices such as the I/O interfaces 810, the I/O devices 814, the communication interfaces 808, and provide various services to applications or modules executing on the processors 804. The OS module 818 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 816 may be a data store 820 and one or more of the following modules. These modules may be executed as foreground applications, background tasks, daemons, and so forth. The data store 820 may use a flat file, database, linked list, tree, executable code, script, or other data structure to store information. In some implementations, the data store 820 or a portion of the data store 820 may be distributed across one or more other devices including the servers 704, network attached storage devices, and so forth.

A communication module 822 may be configured to establish communications with one or more of the carts 110, sensors 122, display devices 712(3), other servers 704, or other devices. The communications may be authenticated, encrypted, and so forth.

The memory 816 may store an inventory management module 824. The inventory management module 824 is configured to provide the inventory functions as described herein with regard to the inventory management system 120. For example, the inventory management module 824 may track items 106 between different inventory locations 612, to and from the carts 110, determine tidiness of a return, and so forth. The inventory management module 824 may access sensor data 826 such as one or more of the weight sensor data 118 or the other sensor data 124.

Information used by the inventory management module 824 may be stored in the data store 820. For example, the data store 820 may store the item data 126, physical layout data 828, cart state data 224, threshold data 830, interaction data 614, user billing data 130, inventory data 132, output data 832, and so forth.

The inventory management module 824 may utilize physical layout data 828 during operation. The physical layout data 828 may provide information indicative of where weight sensors 116, other sensors 122, inventory locations, and so forth are in the facility with respect to one another. For example, the physical layout data 828 may comprise information representative of a map or floor plan of the facility with relative positions of inventory locations, associated weight sensors 116, sensors 122, planogram data indicative of how items 106 are to be arranged at the inventory locations, and so forth.

The physical layout data 828 may associate a particular inventory location identifier (ID) with other information such as physical layout data, sensor position data, sensor direction data, sensor identifiers, and so forth. The physical layout data provides information about where in the facility objects are, such as the inventory location, the sensors 122, and so forth. In some implementations, the physical layout data may be relative to another object. For example, the physical layout data may indicate that the weight sensor 116(1) is associated with the lane 104(1).

The inventory management module 824 may utilize this information during operation. For example, the tracking module 236 may utilize physical layout data 828 to determine what sensor data 826 acquired from particular cameras 122(1) corresponds to a particular shelf 102, lane 104, or other inventory location.

The inventory management module 824 may process the sensor data 826 and generate output data 832. For example, the sensor data 826 comprises information acquired by one or more the weight sensors 116 or the sensors 122. The threshold data 830 may comprise one or more thresholds. For example, the threshold value may specify a minimum quantity value below which a restocking order is generated. The output data 832 may then comprise a restocking order. In another example, the output data 832 may comprise a dispatch order for an attendant to remedy an inventory location designated as untidy, such as the untidy lane 114.

In some implementations, the determination by the inventory management module 824 that the tidiness data 128 is below the threshold value for an inventory location 612 may trigger actions, such as reprocessing the sensor data 826. For example, the reprocessing the sensor data 826 may comprise processing image data using one or more of different recognition modules, receiving input from a human operator, and so forth.

Other modules 834 may also be present in the memory 816 as well as other data 836 in the data store 820. For example, the other modules 834 may include a restocking module.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a shelf having a first lane designated to hold a first type of item;
one or more weight sensors associated with the shelf;
a cart to hold one or more items;
one or more sensors associated with the cart; and
a computing device comprising:
  a memory storing first computer-executable instructions; and
  a hardware processor to execute the first computer-executable instructions to:
    acquire weight data from the one or more weight sensors;
    determine a weight change indicative of an increase in weight at the first lane;
    determine an occurrence of an event at the first lane based on the weight change, the event indicative of a return of an item to the first lane;
    determine a cart identifier based on sensor data acquired by the one or more sensors;
    determine a first location of the cart;
    determine an association between the first location and the shelf, based on layout data;
    access item data associated with one or more characteristics of one or more items at the shelf;
    determine, based at least on the sensor data and the item data, cart state data indicative of two or more item identifiers representative of two or more items held in the cart before the occurrence of the event and a weight for each of the two or more items in the cart before the occurrence of the event;
    determine, for each of the two or more item identifiers in the cart state data, a difference value comprising an absolute value of a difference between the weight change and the weight of the each of the two or more items in the cart before the occurrence of the event;

sort the two or more item identifiers in the cart before the occurrence of the event in ascending order by their respective difference values to produce sorted cart data;
determine, from the sorted cart data, a first candidate item weight comprising the weight of a first item associated with a first position in the sorted cart data;
determine the first candidate item weight is within a first threshold of the weight change;
designate as a first error value the difference value comprising the absolute value of the difference between the weight change and the weight of the first item associated with the first position in the sorted cart data;
determine, from the sorted cart data, a second candidate item weight comprising the weight of a second item associated with a second position in the sorted cart data;
determine a second error value comprising the difference value comprising the absolute value of the difference between the weight change and the weight of the second item associated with the second position in the sorted cart data;
determine a margin value comprising a difference between the first error value and the second error value;
determine the first error value is less than a second threshold value;
determine the margin value is greater than a third threshold value; and
generate tidiness data indicative of the item returned to the first lane being of a same type as the first type of item.

2. A method comprising:
determining a weight change value indicative of an increase in weight at a first inventory location based on weight data acquired from one of more weight sensors at the first inventory location;
determining an occurrence of an event indicative of a return of an item to the first inventory location;
tracking a first location of a cart;
determining the first location of the cart is associated with the first inventory location, based on layout data;
acquiring sensor data from one or more sensors associated with the cart;
accessing item data associated with one or more characteristics of one or more items at the first inventory location;
determining, based at least on the sensor data and the item data, cart state data comprising:
a first item identifier indicative of a first item;
a first weight of the first item;
a second item identifier indicative of a second item; and
a second weight of the second item;
determining a first difference value comprising an absolute value of a difference between the weight change value and the first weight;
determining a second difference value comprising an absolute value of a difference between the weight change value and the second weight;
determining the first difference value is less than the second difference value;
determining a first candidate item weight as the first weight;
determining the first candidate item weight is within a first threshold value of the weight change value;

determining one or more metrics associated with the first difference value and the second difference value;
determining one or more threshold values associated with the one or more metrics; and
generating tidiness data using the one or more metrics and the one or more threshold values, the tidiness data indicative of whether a type of the item returned to the first inventory location matches a type of item assigned to the first inventory location.

3. The method of claim 2, the determining the one or more metrics associated with the first difference value and the second difference value comprising:
determining a first error value comprising an absolute value of a difference between the weight change value and the first weight;
determining a second error value comprising an absolute value of a difference between the weight change value and the second weight; and
determining a margin value comprising a difference between the first error value and the second error value.

4. The method of claim 3, the generating the tidiness data comprising:
determining the first error value is less than a second threshold value;
determining the margin value is greater than a third threshold value; and
wherein the tidiness data is indicative of a tidy return to the first inventory location by indicating that the type of the item returned to the first inventory location matches the type of item assigned to the first inventory location.

5. The method of claim 4, further comprising:
determining a user identifier associated with the cart state data; and
determining one or more of the first threshold value, the second threshold value, or the third threshold value based at least in part on the user identifier.

6. The method of claim 4, further comprising:
determining one or more of the first threshold value, the second threshold value, or the third threshold value based at least in part on the first inventory location.

7. The method of claim 4, further comprising:
determining reliability data for the one or more weight sensors used to acquire the weight data used to determine the weight change value; and
determining one or more of the first threshold value, the second threshold value, or the third threshold value based at least in part on the reliability data.

8. The method of claim 4, further comprising:
determining a user identifier associated with the cart state data;
determining the weight change value using first weight data obtained at a first time;
determining a second weight change value using second weight data obtained at a second time; and
determining one or more of the first threshold value, the second threshold value, or the third threshold value based at least in part on a difference between the first time and the second time exceeding a minimum value.

9. The method of claim 2, further comprising:
determining a removal of a third item from the first inventory location;
determining a third weight of the third item associated with the removal of the third item; and
adding, to the cart state data:
a third item identifier indicative of the third item; and
the third weight of the third item.

10. The method of claim 2, further comprising:
determining the one or more metrics are indicative of an untidy return;
accessing image data that includes at least a portion of the first inventory location;
processing the image data to determine an item identifier associated with the increase in weight at the first inventory location;
determining the item identifier associated with the increase in weight corresponds to one of the first item identifier or the second item identifier in the cart state data; and
modifying the cart state data to indicate the return of the item identifier associated with the increase in weight.

11. A method comprising:
determining a weight change value at a first inventory location based on weight data acquired from one or more weight sensors at the first inventory location, the weight change value indicative of an increase in weight at the first inventory location;
determining an occurrence of an event at the first inventory location, the event indicative of a return of an item to the first inventory location;
tracking a first location of a cart;
determining the first location of the cart is associated with the first inventory location, based on layout data;
acquiring sensor data from one or more sensors associated with the cart;
determining item data associated with one or more items at the first inventory location;
determining, based at least on the sensor data and the item data, cart state data indicative of two or more item identifiers representative of two or more items held in the cart before the occurrence of the event at the first inventory location and a respective item weight associated with each of the two or more item identifiers;
determining a difference between the weight change value and the respective item weight associated with the each of the two or more item identifiers;
determining a confidence value for each of the two or more item identifiers in the cart state data, wherein the confidence value is indicative of a likelihood that an item associated with an item identifier is associated with the weight change value at the first inventory location;
determining a first item identifier in the cart state data that is associated with a highest confidence value;
determining a first item weight associated with the first item identifier is within a first threshold value of the weight change value;
determining a first error value indicative of an absolute value of a difference between the weight change value and the first item weight associated with the first item identifier;
determining the first error value is below a second threshold value; and
generating tidiness data indicative of the item returned to the first inventory location matching a type of item assigned to the first inventory location.

12. The method of claim 11, wherein the confidence value for the each of the two or more item identifiers comprises the difference between the weight change value and the respective item weight associated with the each of the two or more item identifiers.

13. The method of claim 12, further comprising:
determining a second weight change value at the first inventory location, wherein the second weight change value is obtained before the weight change value;
adding, to the cart state data, an item identifier indicative of the item removed from the first inventory location and the second weight change value; and
wherein the respective item weight of one of the two or more items stored in the cart before the occurrence of the event at the first inventory location comprises the second weight change value.

14. The method of claim 11, further comprising:
determining that the first item weight associated with the first item identifier associated with the highest confidence value as compared to the weight change value exceeds the first threshold value; and
wherein the tidiness data is indicative of an untidy return of the item to the first inventory location.

15. The method of claim 11, further comprising:
determining a second item identifier associated with a second highest confidence value;
determining a second error value comprising an absolute value of the difference between the weight change value and an item weight associated with the second item identifier associated with the second highest confidence value;
determining a margin value comprising a difference between the first error value and the second error value; and
wherein the generating the tidiness data is based at least in part on one or more of the first error value or the margin value.

16. The method of claim 15, the generating the tidiness data comprising:
determining the margin value is greater than a third threshold value; and
wherein the tidiness data is indicative of a tidy return to the first inventory location.

17. The method of claim 16, further comprising:
determining one or more of the second threshold value or the third threshold value based at least in part on one or more of:
the first inventory location, or
a user identifier associated with the weight change value.

18. The method of claim 15, further comprising:
determining a user identifier associated with the cart state data;
determining the weight change value is based on first weight data obtained at a first time;
determining a second weight change value is based on second weight data obtained at a second time;
determining one or more of a second threshold value, or a third threshold value based at least in part on a difference between the first time and the second time; and
comparing the margin value to the third threshold value.

19. The method of claim 11, further comprising:
determining reliability data for the one or more weight sensors used to acquire the weight data; and
determining one or more thresholds based at least in part on the reliability data.

20. The method of claim 11, further comprising:
determining the tidiness data is indicative of an untidy return; and
initiating one or more of:
    generating a dispatch to remove the item that was returned to the first inventory location,
    decreasing a confidence value for subsequent actions associated with the first inventory location, or
    determining an item identifier associated with the weight change value at the first inventory location using the weight data from the one or more weight sensors.

\* \* \* \* \*

UNITED STATES PATENT AND TRADEMARK OFFICE
CERTIFICATE OF CORRECTION

PATENT NO. : 11,195,140 B1
APPLICATION NO. : 15/703302
DATED : December 7, 2021
INVENTOR(S) : Paul Eugene Munger et al.

It is certified that error appears in the above-identified patent and that said Letters Patent is hereby corrected as shown below:

On the Title Page

Column 2, Abstract:
Currently reads:
A user may pick an item from a first inventory location, such as in a lane on a shelf, and may return it another location that is assigned to another type of item. Described are techniques to generate tidiness data that is indicative of whether an item has been returned to an inventory location assigned to that type of item. As items are taken, information about the type of item taken and its weight are stored. When an increase in weight at a lane indicates a return of an item to the lane, the weight of the return is compared to the stored weight of the items previously taken by a user. If the weights correspond to within a threshold value, the type of item associated with the stored weight is deemed to be returned and tidiness data indicative of a tidy return of the item to its appointed lane may be generated.

Where it should read:
--A user may pick an item from a first inventory location, such as a lane on a shelf, and may return it to another location that is assigned to another type of item. Described are techniques to generate tidiness data indicative of whether an item has been returned to an inventory location assigned to that type of item. As items are taken, information about the type of item taken and its weight are stored. When an increase in weight at a lane indicates a return of an item to the lane, the weight of the return is compared to the stored weight of the items previously taken by a user. If the weights are within a threshold value, the type of item associated with the stored weight is deemed to be returned and tidiness data indicative of a tidy return of the item to its appointed lane may be generated.--

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*